US012793186B2

(12) United States Patent
Saharia et al.

(10) Patent No.: US 12,793,186 B2
(45) Date of Patent: *Nov. 10, 2026

(54) IMAGE ENHANCEMENT VIA ITERATIVE REFINEMENT BASED ON MACHINE LEARNING MODELS

(71) Applicant: Google LLC, Mountain View, CA (US)

(72) Inventors: Chitwan Saharia, Toronto (CA); Jonathan Ho, Berkeley, CA (US); William Chan, Toronto (CA); Tim Salimans, Utrecht (NL); David Fleet, Toronto (CA); Mohammad Norouzi, Toronto (CA)

(73) Assignee: Google LLC, Mountain View, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 18/939,994

(22) Filed: Nov. 7, 2024

(65) Prior Publication Data

US 2025/0061551 A1 Feb. 20, 2025

Related U.S. Application Data

(63) Continuation of application No. 18/227,120, filed on Jul. 27, 2023, now Pat. No. 12,165,289, which is a continuation of application No. 18/155,420, filed on Jan. 17, 2023, now Pat. No. 11,756,166, which is a (Continued)

(51) Int. Cl.

| | |
|---|---|
| ***G06T 5/70*** | (2024.01) |
| ***G06N 3/045*** | (2023.01) |

(Continued)

(52) U.S. Cl.

CPC ............... *G06T 5/70* (2024.01); *G06N 3/045* (2023.01); *G06N 3/08* (2013.01); *G06T 3/4007* (2013.01);

(Continued)

(58) Field of Classification Search

CPC ........ G06T 3/4053; G06T 5/002; G06T 5/003

See application file for complete search history.

(56) References Cited

U.S. PATENT DOCUMENTS 11,769,228 B2 9/2023 Saharia et al.

OTHER PUBLICATIONS

"Bicubic interpolation," Wikipedia, http://en.wikipedia.org/wiki/Bicubic_interpolation, downloaded Jul. 2024, 7 pages.

(Continued)

*Primary Examiner* — Raphael Schwartz

(74) *Attorney, Agent, or Firm* — McDonnell Boehnen Hulbert & Berghoff LLP

(57) ABSTRACT

A method includes receiving, by a computing device, training data comprising a plurality of pairs of images, wherein each pair comprises an image and at least one corresponding target version of the image. The method also includes training a neural network based on the training data to predict an enhanced version of an input image, wherein the training of the neural network comprises applying a forward Gaussian diffusion process that adds Gaussian noise to the at least one corresponding target version of each of the plurality of pairs of images to enable iterative denoising of the input image, wherein the iterative denoising is based on a reverse Markov chain associated with the forward Gaussian diffusion process. The method additionally includes outputting the trained neural network.

20 Claims, 17 Drawing Sheets
(9 of 17 Drawing Sheet(s) Filed in Color)

Related U.S. Application Data continuation of application No. 17/391,150, filed on Aug. 2, 2021, now Pat. No. 11,769,228.

(51) Int. Cl.
*G06N 3/08* (2023.01)
*G06T 3/4007* (2024.01)
*G06T 5/50* (2006.01)

(52) U.S. Cl.
CPC ...... *G06T 5/50* (2013.01); *G06T 2207/20016* (2013.01); *G06T 2207/20081* (2013.01); *G06T 2207/20084* (2013.01)

(56) References Cited

OTHER PUBLICATIONS

Abdullah et al., "Application of Interpolation Image by using Bi-Cubic Algorithm," IOP Conf. Series: Journal of Physics: Conf. Series 1114, WMA-Mathcomtech 2018, 7 pages.

Cao et al., "Deconvolutional neural network for image super-resolution," Neural Networks, 2020, pp. 394-404.

Chen et al., WaveGrad: Estimating Gradients for Waveform Generation, arXiv:2009.00713v2, Oct. 9, 2020, 15 pages.

Dong et al., "Accelerating the super-resolution convolutional neural network," arXiv:1608.00367v1, Computer Vision—ECCV 2016: Proceedings of the 14th European Conference, Amsterdam, the Netherlands, Oct. 11-14, 2016, 17 pages.

Esser et al., "Taming Transformers for High-Resolution Image Synthesis," arXiv:2012.09841v3, Jun. 23, 2021, 52 pages.

Ho et al., "Denoising diffusion probabilistic models," Advances in Neural Information Processing Systems, 2020, 12 pages, vol. 33.

Ho et al., "High Fidelity Image Generation Using Diffusion Models", Google AI Blog, https://ai.googleblog.com/2021/07/high-fidelitymage-generation-using.html, Jul. 16, 2021, 6 pages.

Rombach et al., "High-Resolution Image Synthesis with Latent Diffusion Models," arXiv:2112.10752v2, Apr. 13, 2022, 15 pages.

Saharia et al., "Image Super-Resolution via Iterative Refinement", arXiv:2104.07636v2, Jun. 30, 2021, 28 pages.

Saharia et al., "Palette: Image-to-Image Diffusion Models," arXiv:2111.05826v2, May 3, 2022, 29 pages.

300B

| Task | Channel Dim | Depth Multipliers | # ResNet Blocks | # Parameters |
|---|---|---|---|---|
| 16 x 16 --> 128 x 128 | 128 | {1, 2, 4, 8, 8} | 3 | 550M |
| 64 x 64 --> 256 x 256 | 128 | {1, 2, 4, 4, 8, 8} | 3 | 625M |
| 64 x 64 --> 512 x 512 | 64 | {1, 2, 4, 8, 8, 16, 16} | 3 | 625M |
| 256 x 256 --> 1024 x 1024 | 16 | {1, 2, 4, 8, 16, 32, 32, 32} | 2 | 150M |

700

Class Conditional ImageNet Samples 256 x 256

900

| Model (910) | FID (920) | IS (930) |
|---|---|---|
| Reference (9R1) | 1.9 | 240.8 |
| Regression (9R2) | 15.2 | 121.1 |
| SR3 (9R3) | 5.2 | 180.1 |

FIG. 9

1200

| Model 1210 | 1220 FID-50K |
|---|---|
| **Other Models** 1230 | |
| VQ-VAE-2 | 38.1 |
| BigGAN (Truncation 1.5) | 11.8 |
| **SR3 Model** 1240 | |
| SR3 (Two Stage) | 11.3 |

FIG. 12

1300

| Model 1310 | 1320 FID-50K |
|---|---|
| **Training with Augmentation** 1330 | |
| SR3 | 13.1 |
| SR3 (with Gaussian Blur) | 11.3 |
| **Objective $L_p$ Norm** 1340 | |
| SR3 ($L_2$) | 11.8 |
| SR3 ($L_1$) | 11.3 |

FIG. 13

IMAGE ENHANCEMENT VIA ITERATIVE REFINEMENT BASED ON MACHINE LEARNING MODELS

CROSS-REFERENCE TO RELATED DISCLOSURE

This application is a continuation of U.S. patent application Ser. No. 18/227,120, filed Jul. 27, 2023, which is a continuation of U.S. patent application Ser. No. 18/155,420, filed Jan. 17, 2023, which is a continuation of U.S. patent application Ser. No. 17/391,150, filed Aug. 2, 2021, which are incorporated herein by reference in their entirety.

BACKGROUND

Neural networks can be trained to enhance images. Single-image super-resolution is a process of generating a high-resolution image that is consistent with an input low-resolution image. This may be considered to be part of a broad family of image-to-image translation tasks, including colorization, in-painting, and de-blurring. Like many such inverse problems, image super-resolution can be challenging because multiple output images may be consistent with a single input image, and a conditional distribution of output images given the input may not conform well to simple parametric distributions, such as, for example, a multivariate Gaussian.

SUMMARY

In one aspect, a computer-implemented method is provided. The method includes receiving, by a computing device, training data comprising a plurality of pairs of images, wherein each pair comprises an image and at least one corresponding target version of the image. The method also includes training a neural network based on the training data to predict an enhanced version of an input image, wherein the training of the neural network comprises applying a forward Gaussian diffusion process that adds Gaussian noise to the at least one corresponding target version of each of the plurality of pairs of images to enable iterative denoising of the input image, wherein the iterative denoising is based on a reverse Markov chain associated with the forward Gaussian diffusion process. The method additionally includes outputting the trained neural network.

In a second aspect, a computing device is provided. The computing device includes one or more processors and data storage. The data storage has stored thereon computer-executable instructions that, when executed by one or more processors, cause the computing device to carry out functions. The functions include: receiving, by a computing device, training data comprising a plurality of pairs of images, wherein each pair comprises an image and at least one corresponding target version of the image; training a neural network based on the training data to predict an enhanced version of an input image, wherein the training of the neural network comprises applying a forward Gaussian diffusion process that adds Gaussian noise to the at least one corresponding target version of each of the plurality of pairs of images to enable iterative denoising of the input image, wherein the iterative denoising is based on a reverse Markov chain associated with the forward Gaussian diffusion process; and outputting the trained neural network.

In a third aspect, an article of manufacture is provided. The article of manufacture includes one or more computer readable media having computer-readable instructions stored thereon that, when executed by one or more processors of a computing device, cause the computing device to carry out functions. The functions include: receiving, by a computing device, training data comprising a plurality of pairs of images, wherein each pair comprises an image and at least one corresponding target version of the image; training a neural network based on the training data to predict an enhanced version of an input image, wherein the training of the neural network comprises applying a forward Gaussian diffusion process that adds Gaussian noise to the at least one corresponding target version of each of the plurality of pairs of images to enable iterative denoising of the input image, wherein the iterative denoising is based on a reverse Markov chain associated with the forward Gaussian diffusion process; and outputting the trained neural network.

In a fourth aspect, a system is provided. The system includes means for receiving, by a computing device, training data comprising a plurality of pairs of images, wherein each pair comprises an image and at least one corresponding target version of the image; means for training a neural network based on the training data to predict an enhanced version of an input image, wherein the training of the neural network comprises applying a forward Gaussian diffusion process that adds Gaussian noise to the at least one corresponding target version of each of the plurality of pairs of images to enable iterative denoising of the input image, wherein the iterative denoising is based on a reverse Markov chain associated with the forward Gaussian diffusion process; and means for outputting the trained neural network.

In a fifth aspect, a computer-implemented method is provided. The method includes receiving, by a computing device, an input image. The method also includes applying a neural network to predict an enhanced version of the input image by iteratively denoising the input image, wherein the iterative denoising is based on a reverse Markov chain associated with a forward Gaussian diffusion process, the neural network having been trained by applying the forward Gaussian diffusion process to add Gaussian noise to at least one corresponding target version of each image of a plurality of pairs of images in training data. The method further includes outputting the predicted enhanced version of the input image.

In a sixth aspect, a computing device is provided. The computing device includes one or more processors and data storage. The data storage has stored thereon computer-executable instructions that, when executed by one or more processors, cause the computing device to carry out functions. The functions include: receiving, by a computing device, an input image; applying a neural network to predict an enhanced version of the input image by iteratively denoising the input image, wherein the iterative denoising is based on a reverse Markov chain associated with a forward Gaussian diffusion process, the neural network having been trained by applying the forward Gaussian diffusion process to add Gaussian noise to at least one corresponding target version of each image of a plurality of pairs of images in training data; and outputting the predicted enhanced version of the input image.

In a seventh aspect, an article of manufacture is provided. The article of manufacture includes one or more computer readable media having computer-readable instructions stored thereon that, when executed by one or more processors of a computing device, cause the computing device to carry out functions. The functions include: receiving, by a computing device, an input image; applying a neural network to predict an enhanced version of the input image by iteratively denoising the input image, wherein the iterative denoising is based on a reverse Markov chain associated with a forward Gaussian diffusion process, the neural network having been trained by applying the forward Gaussian diffusion process to add Gaussian noise to at least one corresponding target version of each image of a plurality of pairs of images in training data; and outputting the predicted enhanced version of the input image.

In an eighth aspect, a system is provided. The system includes means for receiving, by a computing device, an input image; means for applying a neural network to predict an enhanced version of the input image by iteratively denoising the input image, wherein the iterative denoising is based on a reverse Markov chain associated with a forward Gaussian diffusion process, the neural network having been trained by applying the forward Gaussian diffusion process to add Gaussian noise to at least one corresponding target version of each image of a plurality of pairs of images in training data; and means for outputting the predicted enhanced version of the input image.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

The patent or application on file contains at least one drawing executed in color. Copies of this patent or patent application publication with color drawings will be provided by the Office upon request and payment of the necessary fee.

FIG. 9 is a table illustrating performance comparisons between Super-Resolution via Repeated Refinement (SR3) and a Regression baseline, in accordance with example embodiments.

FIG. 12 is a table illustrating FID scores, in accordance with example embodiments.

FIG. 13 is a table illustrating results of an ablation study on an SR3 model, in accordance with example embodiments.

DETAILED DESCRIPTION

Figure 1:
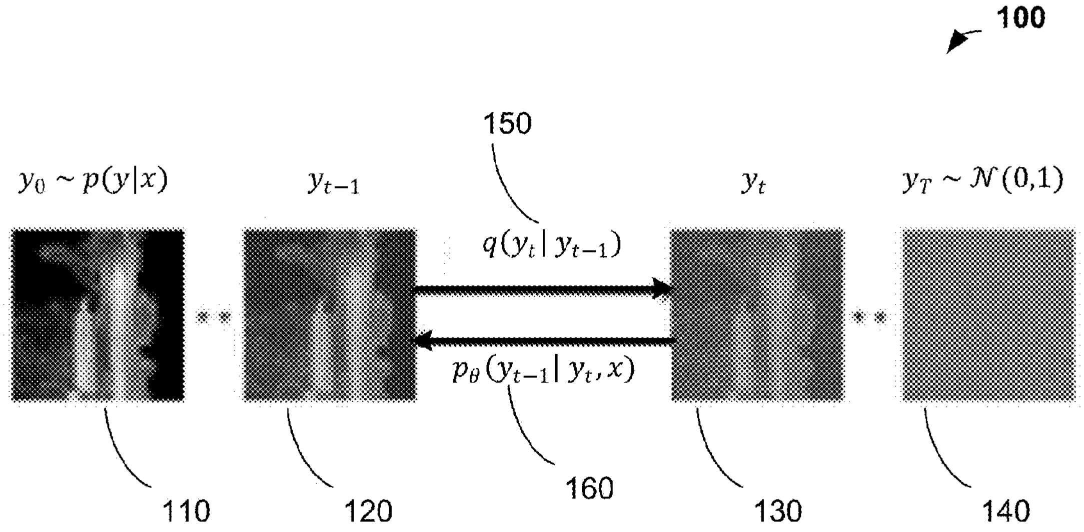
FIG. 1 is a diagram illustrating an example of a forward diffusion process and an iterative denoising process, in accordance with example embodiments.

This application relates, in one aspect, to enhancing an image via iterative refinement. In some aspects, such enhancement may be based on denoising diffusion probabilistic models. For example, denoising diffusion probabilistic models may be adapted to conditional image generation that enables super-resolution through a stochastic denoising process. Inference may begin with pure Gaussian noise and may iteratively refine a noisy output using a U-Net model trained on denoising at various noise levels.

Overview and Introduction

Single-image super-resolution is a process of generating a high-resolution image that is consistent with an input low-resolution image. Such a process is part of a broader family of image-to-image translation tasks, including colorization, in-painting, de-blurring, and so forth. These belong to a class of challenging inverse problems because multiple output images may be consistent with a single input image, and a conditional distribution of output images given the input, typically does not conform well to simple parametric distributions, such as, for example, a multivariate Gaussian. Accordingly, while regression-based methods with feedforward convolutional nets may work for super-resolution at low magnification ratios, they may be unable to capture high-fidelity details needed for high magnification ratios.

Image super-resolution may have applications that can range from restoring old family portraits to improved medical imaging systems. Another such image synthesis task is class-conditional image generation, in which a model is trained to generate a sample image from an input class label. The resulting generated sample images can be used, for example, to improve performance of downstream models for image classification, segmentation, and more.

In some situations, deep generative models may be trained to learn complex empirical distributions of images. Also, for example, autoregressive models, variational autoencoders (VAEs), normalizing flows (NFs), and Generative Adversarial Networks (GANs) may also be utilized in conditional tasks such as image super-resolution. However, such approaches present various challenges. For example, autoregressive models (ARs) may be very expensive for high-resolution image generation and may have slow synthesis speed, NFs and VAEs may yield suboptimal sample quality, and GANs may require carefully designed regularization and optimization steps to tame optimization instability and mode collapse.

Autoregressive models may model exact data log likelihood, capturing rich distributions. However, their sequential generation of pixels is expensive, limiting application to low-resolution images. Normalizing flows may improve on sampling speed while modelling the exact data likelihood, but a need for invertible parameterized transformations with a tractable Jacobian determinant limits the expressiveness of normalizing flows. VAEs may offer fast sampling, but may tend to underperform GANs and ARs in image quality. GANs may be generally used for class-conditional image generation and super-resolution. Nevertheless, the inner-outer loop optimization in GANs often requires tricks to stabilize training, and conditional tasks like super-resolution usually require an auxiliary consistency-based loss to avoid mode collapse. Cascades of GAN models may also be used to generate higher resolution images.

Score matching may model a gradient of the data log-density with respect to the image. Score matching on noisy data, also known as denoising score matching, may be equivalent to training a denoising autoencoder, and to DDPMs. Denoising score matching over multiple noise scales with Langevin dynamics sampling from the learned score functions may be effective for high quality unconditional image generation.

Generally, superresolution is regression based and trained with a Mean Squared Error (MSE) loss. As such, they may effectively estimate the posterior mean, yielding blurry images when the posterior is multimodal. The regression baseline defined herein is a one-step regression model trained with MSE, but with a large U-Net architecture. Super-Resolution via Repeated Refinement (SR3), by comparison, relies on a series of iterative refinement steps, each of which is trained with a regression loss. Such a difference enables the iterative approach described herein to capture richer distributions. Further, rather than estimating the posterior mean, SR3 generates samples from the target posterior. SR3 can generate high resolution images, e.g., 1024×1024, but with a constant number of refinement steps (often no more than 100). SR3 uses a series of reverse diffusion steps to transform a Gaussian distribution to an image distribution while flows require a deep and invertible network.

Autoregressive models have also been used for super-resolution and cascaded up-sampling. Nevertheless, inference limits are expensive, and ARs are therefore limited in their applicability to low-resolution images. However, SR3 can generate high resolution images, e.g., 1024×1024, but with a constant number of refinement steps (often no more than 100).

Normalizing flows have been used for super-resolution with a multi-scale approach. They are capable of generating 1024×1024 images due in part to their efficient inference process. But SR3 uses a series of reverse diffusion steps to transform a Gaussian distribution to an image distribution, whereas normalizing flows require a deep and invertible network.

GAN-based super-resolution methods such as Face Super-Resolution Generative Adversarial Network (FSR-GAN) and Photo Upsampling via Latent Space Exploration (PULSE) may produce high quality face super-resolution results. However, many such methods tend to focus specifically on faces. By contrast, the techniques described herein may be applied to both faces and large-scale natural image datasets.

As described herein, SR3 is an approach to conditional image generation based on Denoising Diffusion Probabilistic Models (DDPMs), and denoising score matching. SR3 may be trained to transform a standard normal distribution into an empirical data distribution by applying a sequence of refinement steps that are similar to Langevin dynamics. In some embodiments, a U-Net architecture may be trained with a denoising objective to iteratively remove various levels of noise from an output. By adapting DDPMs to conditional image generation, some of the challenges with existing techniques may be overcome. For example, instead of an inner-loop optimization as in GANs, a loss function may be optimized. As described herein, denoising score matching and diffusion models are extended to super-resolution, with a simple learning objective, a constant number of inference generation steps, and high quality generation.

As described herein, SR3 can be applied across a range of magnification factors and input resolutions. Also, for example, SR3 models may be cascaded, for example, by going from 64×64 to 256×256 resolution, and subsequently to 1024×1024 resolution. In some embodiments, cascading models facilitate independent training of a number of models with small magnification factors, rather than a single large model with a high magnification factor. Generally, such chained models may enable more efficient inference, since directly generating a high-resolution image requires more iterative refinement steps for the same quality. Also, for example, an unconditional generative model may be chained with SR3 models to unconditionally generate high-fidelity images. Instead of applying to specific domains (e.g., faces), SR3 can be effectively applied on images of a plurality of objects.

In some aspects, unconditional and class-conditional generation may be achieved by cascading a 64×64 image synthesis model with SR3 models to progressively generate 1024×1024 unconditional faces in three stages, and 256×256 class-conditional samples in two stages.

Conditional Denoising Diffusion Model

FIG. 1 is a diagram illustrating an example of a forward diffusion process and an iterative denoising process, in accordance with example embodiments. For example, a given dataset of input-output image pairs, denoted $$\mathcal{D} = \{x_i, y_i\}_{i=1}^N,$$

may represent samples drawn from an unknown conditional distribution p (y|x). This is generally a one-to-many mapping in which many target images (or output images) may be consistent with a single source image (or input image). In some embodiments, a parametric approximation to p(y|x) may be learned through a stochastic iterative refinement process, that maps a source image x to a target image $y \in \mathbb{R}^d$. In some aspects, an approach based on adapting the denoising diffusion probabilistic (DDPM) model to conditional image generation may be utilized.

In some embodiments, the conditional DDPM model may generate a target image $y_0$, represented by image 110, in T refinement steps. For example, starting with a pure noise image $y^T \sim \mathcal{N}(0,1)$, represented by image 140, the model may iteratively refine the image through successive iterations ($y_{T-1}, y_{T-2}, \ldots, y_0$), represented by images 130, 120, etc., according to learned conditional transition distributions 160, given as $p_\theta(y_{t-1}|y_t, x)$, such that $y_0 \sim p(y|x)$.

In some embodiments, a forward Gaussian diffusion process may be applied that adds Gaussian noise to the at least one corresponding target version of each of a plurality of pairs of images in training data to enable iterative denoising of the input image. For example, the distributions of intermediate images in the inference chain may be defined in terms of a forward diffusion process that gradually adds Gaussian noise to the signal via a fixed Markov chain 150, denoted $q(y_t|y_{t-1})$. In some embodiments, iterative denoising of an input image may be performed to predict an enhanced version of the input image. The iterative denoising may be based on a reverse Markov chain associated with the forward Gaussian diffusion process. For example, the iterative denoising may involve generating, from a first enhanced version output by a first stage of the neural network, a second enhanced version output by a second stage of the neural network. The generating may be based on a reverse Markov chain conditioned on the input image. For example, the reverse Markov chain may be based on the forward diffusion process. In some aspects, the second enhanced version may be of a higher image quality than the first enhanced version. For example, the Gaussian diffusion process may be reversed by iteratively recovering signal from noise through a reverse Markov chain conditioned on x. In principle, each forward process step may be conditioned on x as well. The reverse chain may be learned using a neural denoising model $f_\theta$ that may take as input a source image and a noisy target image, and estimate the noise.

Gaussian Diffusion Process

Diffusion models are configured to corrupt the training data by progressively adding Gaussian noise, slowly eliminating details in the data until it becomes pure noise, and then training a neural network to reverse such a corruption process. Running this reversed corruption process synthesizes data from pure noise by gradually denoising it until a clean sample is produced. This synthesis procedure may be interpreted as an optimization algorithm that follows the gradient of the data density to produce likely samples. In some embodiments, a forward Markovian diffusion process q may be defined that gradually adds Gaussian noise to a high-resolution image $y_0$ over T iterations:

$$q(y_{1:T} \mid y_0) = \prod_{t=1}^{T} q(y_t \mid y_{t-1}) \quad \text{(Eqn. 1)}$$

$$q(y_t \mid y_{t-1}) = \mathcal{N}\left((y_t \mid \sqrt{\alpha_t}\, y_{t-1}, (1-\alpha_t)I\right), \quad \text{(Eqn. 2)}$$

where the scalar parameters $\alpha_{1:T}$ are hyperparameters, subject to $0<\alpha_t<1$, which determines a variance of the noise added at each iteration. Note that $y_{t-1}$ is attenuated by $\sqrt{\alpha_t}$ so that a variance of the random variables remains bounded as $t\to\infty$. For instance, if the variance of $y_{t-1}$ is 1, then the variance of $y_t$ is also 1.

In some embodiments, the distribution of $y_t$ given $y_0$ may be characterized by marginalizing intermediate steps as:

$$q(y_t \mid y_0) = \mathcal{N}\left((y_t \mid \sqrt{\gamma_t}\, y_0, (1-\gamma_t)I\right), \quad \text{(Eqn. 3)}$$

where $$\gamma_t = \prod\nolimits_{i=1}^{t} \alpha_i.$$

Furthermore, with some algebraic manipulation and by completing the square, a posterior distribution of $y_{t-1}$ given $(y_0, y_t)$ may be derived as:

$$q(y_{t-1} \mid y_0, y_t) = \mathcal{N}\left(y_{t-1} \mid \mu, \sigma^2 I\right) \quad \text{(Eqn. 4)}$$

$$\mu = \frac{\sqrt{\gamma_{t-1}}\,(1-\alpha_t)}{1-\gamma_t} y_0 + \frac{\sqrt{\alpha_t}\,(1-\gamma_{t-1})}{1-\gamma_t} y_t \quad \text{(Eqn. 5)}$$

$$\sigma^2 = \frac{(1-\gamma_{t-1})(1-\alpha_t)}{1-\gamma_t} \quad \text{(Eqn. 6)}$$

This posterior distribution may be advantageous when parameterizing the reverse chain and formulating a variational lower bound on the log-likelihood of the reverse chain. In some embodiments, a neural network may learn to reverse this Gaussian diffusion process.

Optimizing the Denoising Model

To enable reversal of the diffusion process, additional information may be utilized in the form of a source image x, and a neural denoising model $f_\theta$ may be optimized that takes as input this source image x and a noisy target image $\tilde{y}$, where $$\tilde{y} = \sqrt{\gamma}\, y_0 + \sqrt{1-\gamma}\,\epsilon, \quad \epsilon \sim \mathcal{N}(0, 1), \quad \text{(Eqn. 7)}$$

and aims to recover the noiseless target image $y_0$. This definition of a noisy target image $\tilde{y}$ is compatible with a marginal distribution of noisy images at different steps of the forward diffusion process in Eqn. 3.

In some embodiments, the applying of the forward Gaussian diffusion process involved determining, for an iterative step, a scalar hyperparameter indicative of a variance of the Gaussian noise at the iterative step. For example, in addition to a source image x and a noisy target image $\tilde{y}$, the denoising model $f_\theta(x, \tilde{y}, \gamma)$ may take as input the sufficient statistics for the variance of the noise $\gamma$. In some embodiments, the iterative denoising of the input image may include predicting a noise vector based on a variance of the Gaussian noise added during the forward Gaussian process. For example, the denoising model $f_\theta(x, \tilde{y}, \gamma)$ may be trained to predict the noise vector $\epsilon$. The denoising model may be provided with information of the level of noise through conditioning on a scalar y. The proposed objective function for training $f_\theta$ may be described as:

$$\mathbb{E}_{(x,y)}\mathbb{E}_{\epsilon,\gamma}\|f_\theta(x, \tilde{y}, \gamma) - \epsilon\|_p^p \quad \text{(Eqn. 8)}$$

where $\gamma \sim \mathcal{N}(0, 1)$, (x, y) may be sampled from the training dataset, $p \in \{1, 2\}$, and $\gamma \sim p(\gamma)$. The distribution of y may have a large impact on a quality of the model and the generated output images.

Instead of regressing the output of $f_\theta$ to $\epsilon$, as in Eqn. 8, the output of $f_\theta$ may be regressed to $y_0$. Given $\gamma$ and $\tilde{y}$, the values of $\epsilon$ and $y_0$ may be derived from each other deterministically, but changing the regression target may have an impact on a scale of the loss function. However, these variants may work reasonably well when $p(\gamma)$ is modified to account for the scale of the loss function.

Inference via Iterative Refinement

Generally, inference under the model described herein may be defined as a reverse Markovian process, which goes in the reverse direction of the forward diffusion process. The model is trained on an image corruption process in which noise is progressively added to a high-resolution image (via a forward Gaussian diffusion process) until only pure noise remains. The model then learns to reverse this process, beginning from pure noise and progressively removing noise to reach a target distribution through the guidance of the input low-resolution image. Starting from Gaussian noise $y_T$, the following may be obtained:

$$p_\theta(y_{0:T} \mid x) = p(y_T)\prod_{t=1}^{T} p_\theta(y_{t-1} \mid y_t, x) \quad \text{(Eqn. 9)}$$

$$p(y_T) = \mathcal{N}(y_T \mid 0, I), \quad \text{(Eqn. 10)}$$

$$p_\theta(y_{t-1} \mid y_t, x) = \mathcal{N}\left(y_{t-1} \mid \mu_\theta(x, y_t, \gamma_t), \sigma_t^2 I\right) \quad \text{(Eqn. 11)}$$

The inference process may be defined in terms of isotropic Gaussian conditional distributions, $p_\theta(y_{t-1}|y_t, x)$, which may be learned. If the noise variance of the forward process steps are set as small as possible, for example, by selecting hyperparameters to be $\alpha_{1:T}\approx 1$, the optimal reverse process $p_\theta(y_{t-1}|y_t, x)$ may become approximately Gaussian. Accordingly, a choice of Gaussian conditionals in the inference process represented by Eq. 11 may provide a reasonable fit to the true reverse process. Meanwhile, $1-\gamma_t$ may be large enough so that $y_T$ is approximately distributed according to the prior in Eqn. 10, $p(y_T)=\mathcal{N}(y_T|0, I)$, allowing the sampling process to start at pure Gaussian noise.

As indicated herein, the denoising model $f_\theta$ may be trained to estimate the noise vector $\epsilon$, given any noisy image $\tilde{y}$ including $y_t$. Thus, given $y_t$, $y_0$ may be approximated by rearranging the terms in Eqn. 7 as:

$$\hat{y}_0 = \frac{1}{\sqrt{\gamma_t}}\left(y_t - \sqrt{1-\gamma_t}\, f_\theta(x, y_t, \gamma_t)\right), \quad \text{(Eqn. 12)}$$

An estimated $\hat{y}_0$ may be substituted into a posterior distribution of $q(y_{t-1}|y_0, y_t)$ in Eqn. 4 to parameterize a mean of $p_\theta(y_{t-1}|y_t, x)$ as:

$$\mu_\theta(x, y_t, \gamma_t) = \frac{1}{\sqrt{\alpha_t}}\left(y_t - \frac{1-\alpha_t}{\sqrt{1-\gamma_t}} f_\theta(x, y_t, \gamma_t)\right), \quad \text{(Eqn. 13)}$$

and the variance of $p_\theta(y_{t-1}|y_t, x)$ may be set to $(1-\alpha_t)$, a default given by the variance of the forward process.

Following this parameterization, each iteration of iterative refinement under the SR3 model may take the form, $$y_{t-1} \leftarrow \frac{1}{\sqrt{\alpha_t}}\left(y_t - \frac{1-\alpha_t}{\sqrt{1-\gamma_t}} f_\theta(x, y_t, \gamma_t)\right) + \sqrt{1-\alpha_t}\,\epsilon_t, \quad \text{(Eqn. 14)}$$

where $\epsilon_t \sim \mathcal{N}(0, I)$. This is similar to one step of Langevin dynamics with $f_\theta$ providing an estimate of the gradient of the data log-density. The choice of the training objective in Eqn. 8 for the probabilistic model outlined in Eqn. 11 may be based on a variational lower bound perspective and a denoising score-matching perspective.

Variational Bound Perspective

As indicated, a choice of the training objective in Eqn. 8 for the probabilistic model outlined in Eqn. 11 may be based on a variational lower bound. For example, if the forward diffusion process is viewed as a fixed approximate posterior to the inference process, the following variational lower bound on the marginal log-likelihood may be derived:

$$\mathbb{E}_{(x,y_0)} \log p_\theta(y_0 \mid x) \geq \mathbb{E}_{(x,y_0)}\mathbb{E}_{q(y_{1:T}|y_0)}\left[\log p(y_T) + \sum_{t\geq 1} \log \frac{p_\theta(y_{t-1} \mid y_t, x)}{q(y_t \mid y_{t-1})}\right] \quad \text{(Eqn. 15)}$$

Given a particular parameterization of the inference process outlined above, the negative variational lower bound may be expressed as the following simplified loss, up to a constant weighting of each term for each time step:

$$\mathbb{E}_{(x,y_0,\epsilon)} \sum_{t=1}^{T} \frac{1}{T}\left\| \epsilon - \epsilon_\theta\left(x, \sqrt{\gamma_t}\, y_0 + \sqrt{1-\gamma_t}\,\epsilon, \gamma_t\right)\right\|_2^2 \quad \text{(Eqn. 16)}$$

where $\epsilon \sim \mathcal{N}(0, I)$. This objective function corresponds to the $L_p$ norm in Eqn. 8 for p=2, and a characterization of $p(\downarrow)$ in terms of a uniform distribution over $\{\gamma_1, \ldots, \gamma_T\}$.

Denoising-Score Matching Perspective

The SR3 approach may be associated with a denoising score matching for training non-normalized energy functions for density estimation. Generally, in such methods, a parametric score function may be learned to approximate a gradient of an empirical data logdensity. To make sure that the gradient of the data log-density is well-defined, each data point may be replaced with a Gaussian distribution with a small variance.

In some embodiments, SR3 may be a variant of denoising score matching in which the target density is given by a mixture of $q(\tilde{y}|y_0, \gamma)=\mathcal{N}(\tilde{y}|\sqrt{\gamma}y_0, 1-\gamma)$ for different values of $y_0$ and $\gamma$. Accordingly, the gradient of data log-density may be determined as:

$$\frac{d\log q(\tilde{y} \mid y_0, \gamma)}{d\tilde{y}} = \frac{\tilde{y} - \sqrt{\gamma}\, y_0}{\sqrt{1-\gamma}} = -\epsilon \quad \text{(Eqn. 17)}$$

which may be used as a regression target of the SR3 model. In some embodiments, the score-matching method may be extended to super-resolution, with a simple learning objective, a constant number of inference generation steps, and high quality generation.

Figure 2:
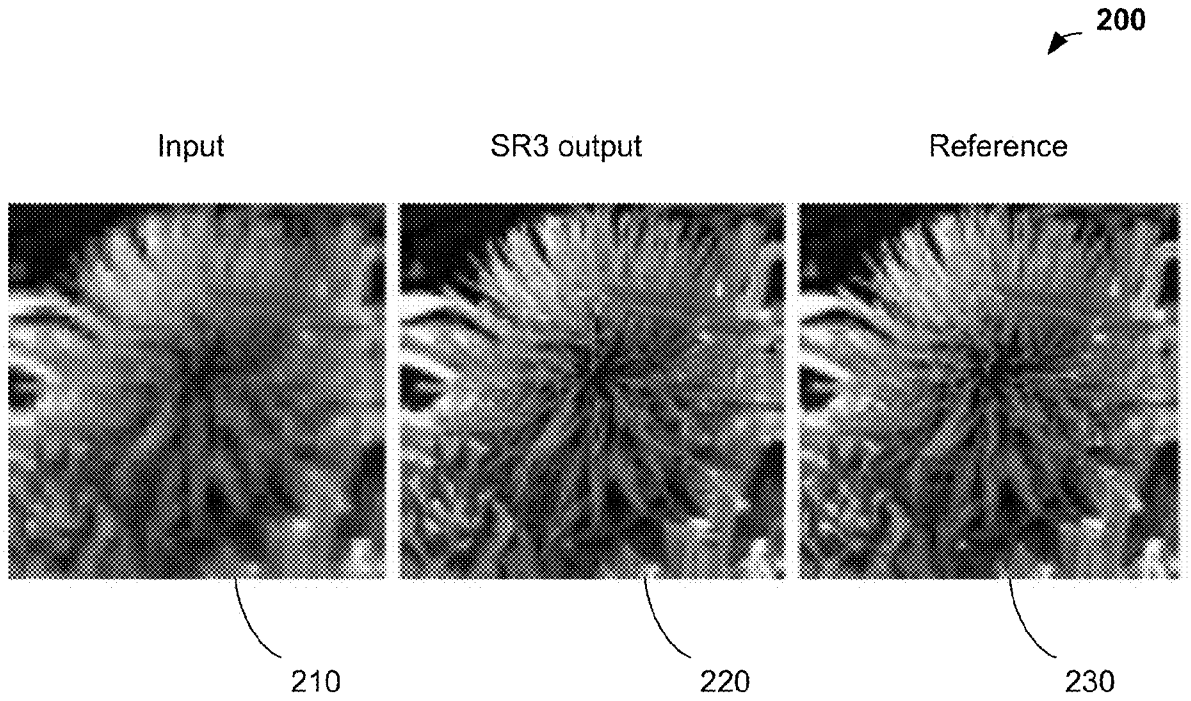
FIG. 2 illustrates an example of an input-output image, in accordance with example embodiments.

FIG. 2 illustrates an example of an input-output image 200, in accordance with example embodiments. For an input image 210, and output image 220 based on the SR3 model is shown. For example, input image 210 is an image with a 16×16 resolution, whereas output image 220 is a 256×256 super-resolution. Also shown is a reference image 230.

Network Architecture

Figures 3A, 3B:
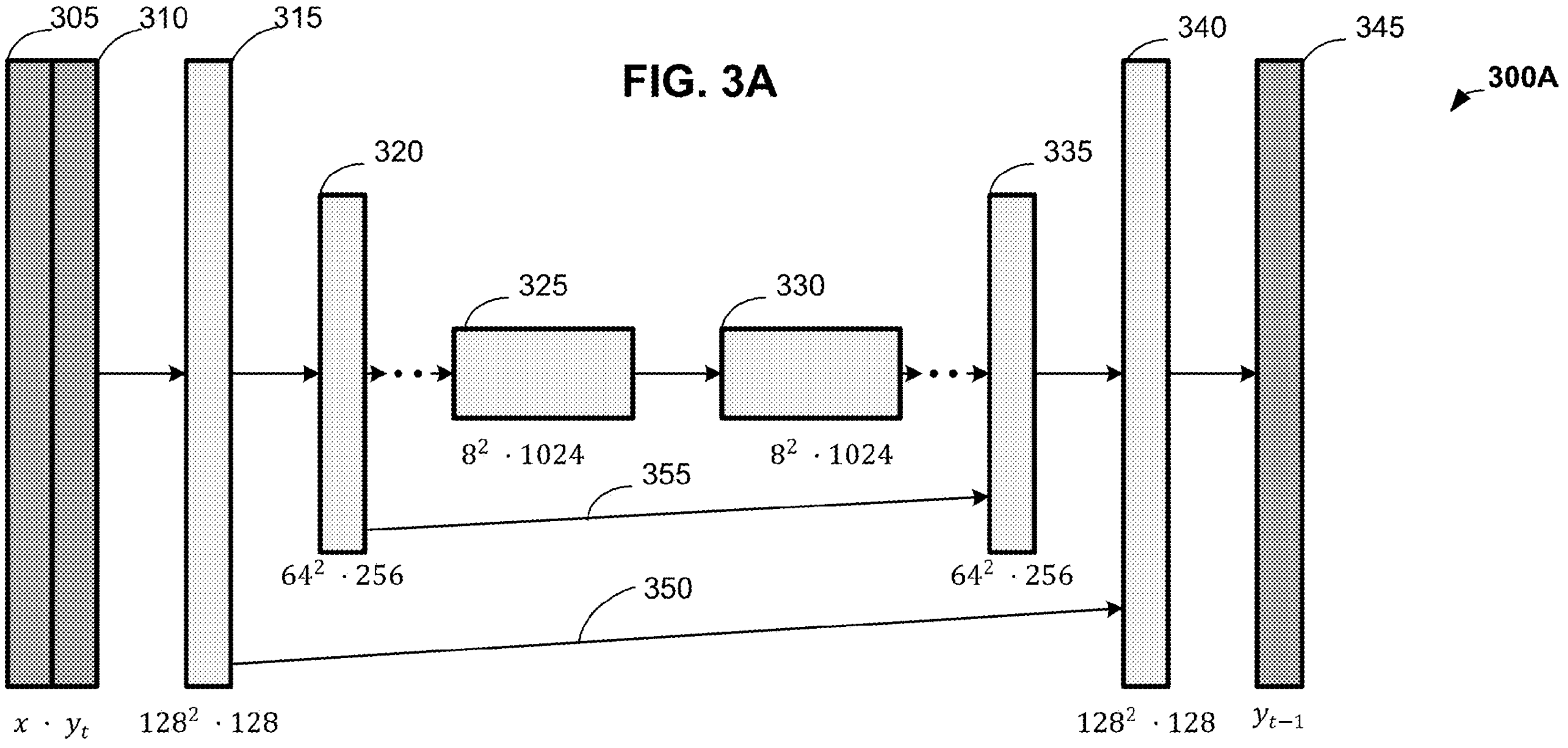
FIG. 3A is a diagram illustrating an example architecture for a neural network, in accordance with example embodiments.
FIG. 3B is a table illustrating task-specific architecture hyperparameters for a U-net model, in accordance with example embodiments.

FIG. 3A is a diagram illustrating an example architecture 300A for a neural network, in accordance with example embodiments. FIG. 3A is a description of an example U-Net architecture 300A with skip connections. The low resolution input image 305, x, may be interpolated to a target high resolution, and concatenated with the noisy high resolution image 310, $y_t$. The activation dimensions for an example task of 16×16→128×128 super resolutions are displayed.

In some embodiments, the neural network may be a convolutional neural network comprising a U-net architecture based on a denoising diffusion probabilistic (DDPM) model. For example, the SR3 architecture may be based on a U-Net 300A, such as, for example a U-net utilized in DDPM, where the original DDPM residual blocks may be replaced with residual blocks from BigGAN, and the skip connections may be rescaled by $$\frac{1}{\sqrt{2}}.$$

In some aspects, a number of residual blocks may be increased, and a number of channel multipliers at different resolutions may be increased as well. To condition the model on the input x, the low-resolution image may be upsampled to the target resolution using bicubic interpolation. The result may be concatenated with $y_t$ along the channel dimension. Although more sophisticated methods of conditioning may be used, concatenation appears to yield similar generation quality.

As indicated in FIG. 3A, in one step of the iteration from first noisy high resolution image 310, $y_t$ to second noisy high resolution image 345, $y_{t-1}$, low resolution input image 305, x, may be downsampled from 128×128 at block 315 to 64×64 at block 320, to 8×8 at block 325. Next, an output from the downsampling process may be upsampled from 8×8 at block 330, to 64×64 at block 335, and 128×128 at block 340. Skip connections may be used, such as for example, skip connection 350 connecting block 315 to block 340, and skip connection 355 connecting block 320 to block 335.

For a training noise schedule, a piecewise distribution may be used for $$\gamma,\ p(\gamma) = \sum_{t=1}^{T} \frac{1}{T} U(\gamma_{t-1}, \gamma_t).$$

For example, during training, a time step t~{0, . . . , T} may be uniformly sampled, followed by sampling $\gamma \sim U(\gamma_{t-1}, \gamma_t)$. In some embodiments, T=2000 may be used.

Some existing diffusion models may require 1-2 k diffusion steps during inference, thereby making generation slow for large target resolution tasks. The models described herein enable more efficient inference. The SR3 model may be conditioned on γ directly (instead of conditioning on t), which allows flexibility in choosing a number of diffusion steps, and the noise schedule during inference. For efficient inference, the maximum inference budget may be set to 100 diffusion steps, and a hyperparameter search may be performed over the inference noise schedule. This search is generally inexpensive as the model may be trained once. FID on held out data may be used to choose a desired noise schedule.

Training

The SR3 and regression models may be trained for 1M training steps with a batch size of 256. In some embodiments, a checkpoint for the regression baseline may be determined based on peak-PSNR on the held out set. Checkpoint selection may not be performed on SR3 models, but the latest checkpoint may be selected. An Adam optimizer with a linear warmup schedule may be used over 10k training steps, followed by a fixed learning rate of 1e-4 for SR3 models and 1e-5 for regression models. In some embodiments, 625M parameters may be used for 64×64→{256×256, 512×512} models, 550M parameters for the 64×64→128×128 models, and 150M parameters for 256×256→1024×1024 models. In some embodiments, a dropout rate of 0.2 may be used for 64×64→128×128 models super-resolution.

FIG. 3B is a table 300B illustrating task-specific architecture hyperparameters for a U-net model, in accordance with example embodiments. Table 300B displays example task specific architecture hyperparameters for the U-Net model described with reference to FIG. 3A. The first column of Table 300B displays a super-resolution task. The second column of Table 300B displays a channel dimension associated with the super-resolution task, while the third column of Table 300B displays one or more depth multipliers associated with the super-resolution task. The term "Channel Dim" refers to the dimension of the first U-Net layer, while the "Depth Multipliers" are the multipliers for subsequent resolutions. For a particular task, the same architecture may be used for both SR3 and Regression models.

In some embodiments, training data comprising a plurality of pairs of images, wherein each pair comprises an image and at least one corresponding target version of the image, may be received. For example, each image may be associated with a plurality of target versions. For example, there may be several different higher resolution versions of an input image of a lower resolution. Also, for example, there may be several different colored versions of an input black and white image. A neural network may be trained based on the training data to predict an enhanced version of an input image. The training of the neural network may include applying a forward Gaussian diffusion process that adds Gaussian noise to the at least one corresponding target version of each of the plurality of pairs of images to enable iterative denoising of the input image, wherein the iterative denoising is based on a reverse Markov chain associated with the forward Gaussian diffusion process. An example algorithm for training a denoising model $f_\theta$ may be given as:

Step 1: repeat

Step 2. $(x, y_0) \sim p(x, y)$

Step 3. $\gamma \sim p(\gamma)$

Step 4. $\epsilon \sim \mathcal{N}(0, I)$

Step 5. Take a gradient descent step on $$\nabla_\theta \| f_\theta(x, \tilde{y}, \gamma) - \epsilon \|_p^p,$$

where $\tilde{y}$ is according to Eqn. 7

Step 6. until converged

Here, $$\| \cdot \|_p^p$$

denotes an $L_p$ norm. In some embodiments, an input image may be received. A neural network to predict an enhanced version of the input image may be applied by iteratively denoising the input image to predict the enhanced version of the input image. The iterative denoising may be based on a reverse Markov chain associated with a forward Gaussian diffusion process, the neural network having been trained by applying the forward Gaussian diffusion process to add Gaussian noise to at least one corresponding target version of each image of a plurality of pairs of images in training data.

For example, the iterative denoising may involve generating, from a first enhanced version output by a first stage of the neural network, a second enhanced version output by a second stage of the neural network, where the generating is based on a Markov chain conditioned on the input image, where the Markov chain is based on a Gaussian diffusion process, and where the second enhanced version is of a higher image quality than the first enhanced version. As described with respect to the training algorithm, the neural network may be trained to apply a forward Gaussian diffusion process that adds Gaussian noise to the at least one corresponding target version of each of the plurality of pairs of images to enable iterative denoising of the input image, wherein the iterative denoising is based on a reverse Markov chain associated with the forward Gaussian diffusion process. An example algorithm for inference in T iterative refinement steps may be given as:

Step 1. $y_T \sim \mathcal{N}(0, I)$

Step 2. for t=T, . . . , 1 do

Step 3. $z \sim \mathcal{N}(0, I)$ if t>1, else z=0

Step 4.

$$y_{t-1} = \frac{1}{\sqrt{\alpha_t}}\left(y_t - \frac{1-\alpha_t}{\sqrt{1-\gamma_t}} f_\theta(x, y_t, \gamma_t)\right) + \sqrt{1-\alpha_t}\, z$$

Step 5. end for

Step 6. return $y_0$

In some embodiments, the input image may be a low resolution image, and the predicted enhanced version may be a higher resolution version of the input image. In some embodiments, the predicted enhanced version may be a magnification of a portion of the input image, where the resolution has been appropriately enhanced to be consistent with a scale of magnification. In some embodiments, the input image may be a video frame of a plurality of video frames that comprise video content. By applying the techniques disclosed herein, one or more video frames may be enhanced to generate a high quality video content. For example, a resolution of the video content can be enhanced. Also, for example, a video with black and white content can be transformed to a video with colored content.

In some embodiments, the input image can be a compressed image, or an image that has been compressed. For example, the input image may be a compressed file of a still image, or a compressed file of video content. Generally, compression allows efficient transmission of data over various networks. For example, a lower bandwidth may be utilized to transmit compressed data. In some embodiments, the compressed image may be stored on a server (e.g., a content server, such as a photo sharing website, a server streaming video content, including online games, a server providing augmented reality and/or virtual reality content, and so forth). Generally, storing and/or transmitting compressed files can significantly reduce the amount of resources that may be needed to store and/or transmit content. In some embodiments, stored content can be of a lower quality, whereas an enhanced version of the content may be provided to a user. For example, a stored version of an image may be of lower quality (e.g., lower resolution, compressed, etc.). However, a higher quality version (e.g., higher resolution, decompressed) may be provided to the user (e.g., via a display component of a mobile device). As another example, a transmitted version of an image may be of lower quality (e.g., lower resolution, compressed, etc.). However, a higher quality version (e.g., higher resolution, decompressed, etc.) may be provided to the user (e.g., via a display component of a mobile device) after transmission.

Evaluations

Effectiveness of SR3 models in super-resolution may be assessed on images of faces, natural images, and synthetic images obtained from a low-resolution generative model. The latter enables high-resolution image synthesis using model cascades. SR3 may be compared with other methods such as FSRGAN and PULSE using human evaluation, and FID scores may be determined for various tasks. Also, for example, comparisons may be made to a regression baseline model that shares the same architecture as SR3, but is trained with a MSE loss. For example, some evaluations may involve:

a. Face super-resolution at 16×16→128×128 and 64×64→512×512 trained on Flickr-Faces-HQ (FFHQ) dataset, and evaluated on CelebA-HQ dataset (a high quality (HQ) version of the CelebA dataset).

b. Natural image super-resolution at 64×64→256×256 pixels on ImageNet.

c. Unconditional 1024×1024 face generation by a cascade of 3 models, and class-conditional 256×256 ImageNet image generation by a cascade of 2 models.

For natural image super-resolution, training may be performed on ImageNet 1K and a dev split may be used for evaluation. In some embodiments, unconditional face and class-conditional ImageNet generative models using DDPM may be trained on the same datasets described herein. For training and testing, low-resolution images may be used that are downsampled using bicubic interpolation with anti-aliasing enabled. For ImageNet, images where the shorter side is less than the target resolution may be discarded. A largest central crop may be used, which may then be resized to the target resolution using area resampling as a high resolution image.

Figure 4:
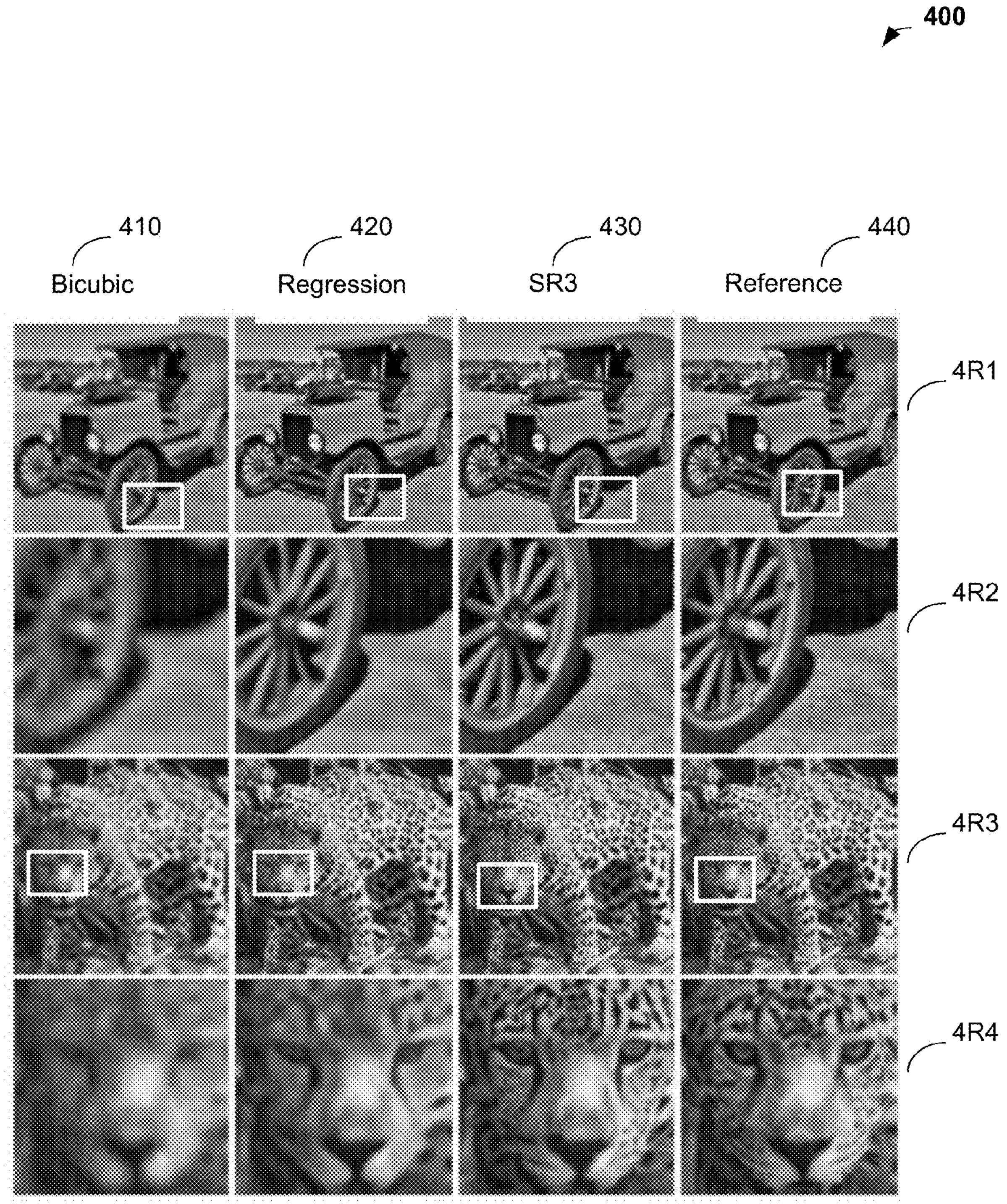
FIG. 4 illustrates example output images, in accordance with example embodiments.

FIG. 4 illustrates example output images 400, in accordance with example embodiments. For example, superresolution of natural images for 64×64→256×256 on an ImageNet dev set, are provided, along with enlarged patches for finer inspection. A bicubic model generates images displayed in the column labeled "Bicubic" 410. A baseline regression model generates images displayed in the column labeled "Regression" 420 that are faithful to the inputs, but are blurry and lack detail. Corresponding reference images are displayed in the column labeled "Reference" 440. As illustrated, images displayed in column labeled "SR3" 430 are sharp images with more detail; this is more evident in the enlarged patches. For example, for an image of an automobile (from the ImageNet database) in row 4R1, an enlarged view of a wheel (shown within a bounding box in the images in row 4R1) is displayed in row 4R2. Likewise, for each image of an animal in row 4R3, an enlarged image of the face (shown within a bounding box in the images in row 4R3) is displayed in row 4R4.

Figure 5:
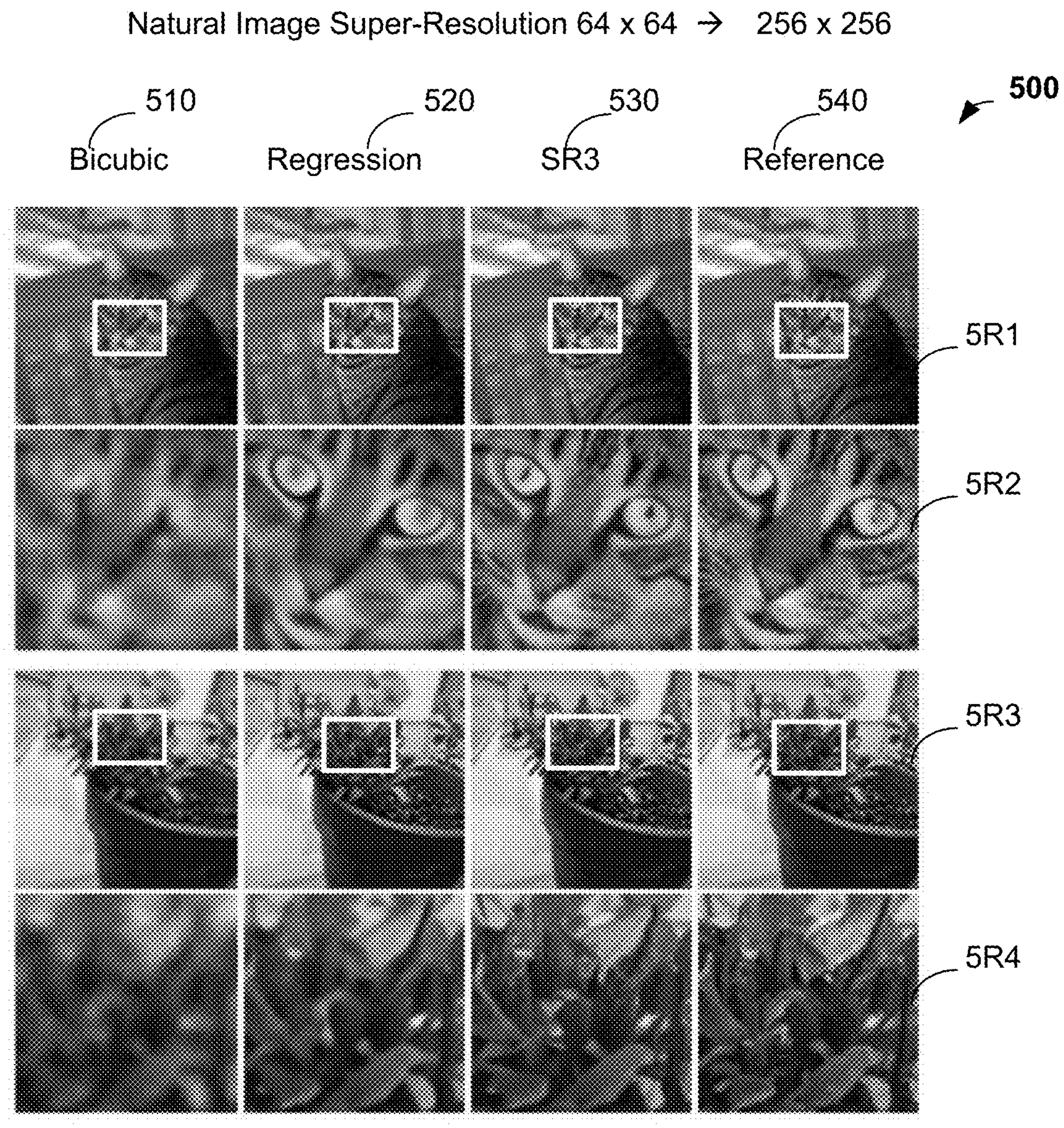
FIG. 5 illustrates example output images, in accordance with example embodiments.

FIG. 5 illustrates example output images 500, in accordance with example embodiments. For example, superresolution of natural images for 64×64→256×256 on an ImageNet dev set, are provided, along with enlarged patches for finer inspection. A bicubic model generates images displayed in the column labeled "Bicubic" 510. A baseline regression model generates images displayed in the column labeled "Regression" 520 that are faithful to the inputs, but are blurry and lack detail. Corresponding reference images are displayed in the column labeled "Reference" 540. As illustrated, images displayed in column labeled "SR3" 530 are sharp images with more detail; this is more evident in the enlarged patches. For example, for an image of a cat (from the ImageNet database) in row 5R1, an enlarged view of the cat's face (shown within a bounding box in the images in row 5R1) is displayed in row 5R2. Likewise, for each image of a potted plant in row 5R3, an enlarged image of the plant (shown within a bounding box in the images in row 5R3) is displayed in row 5R4.

Figure 6:
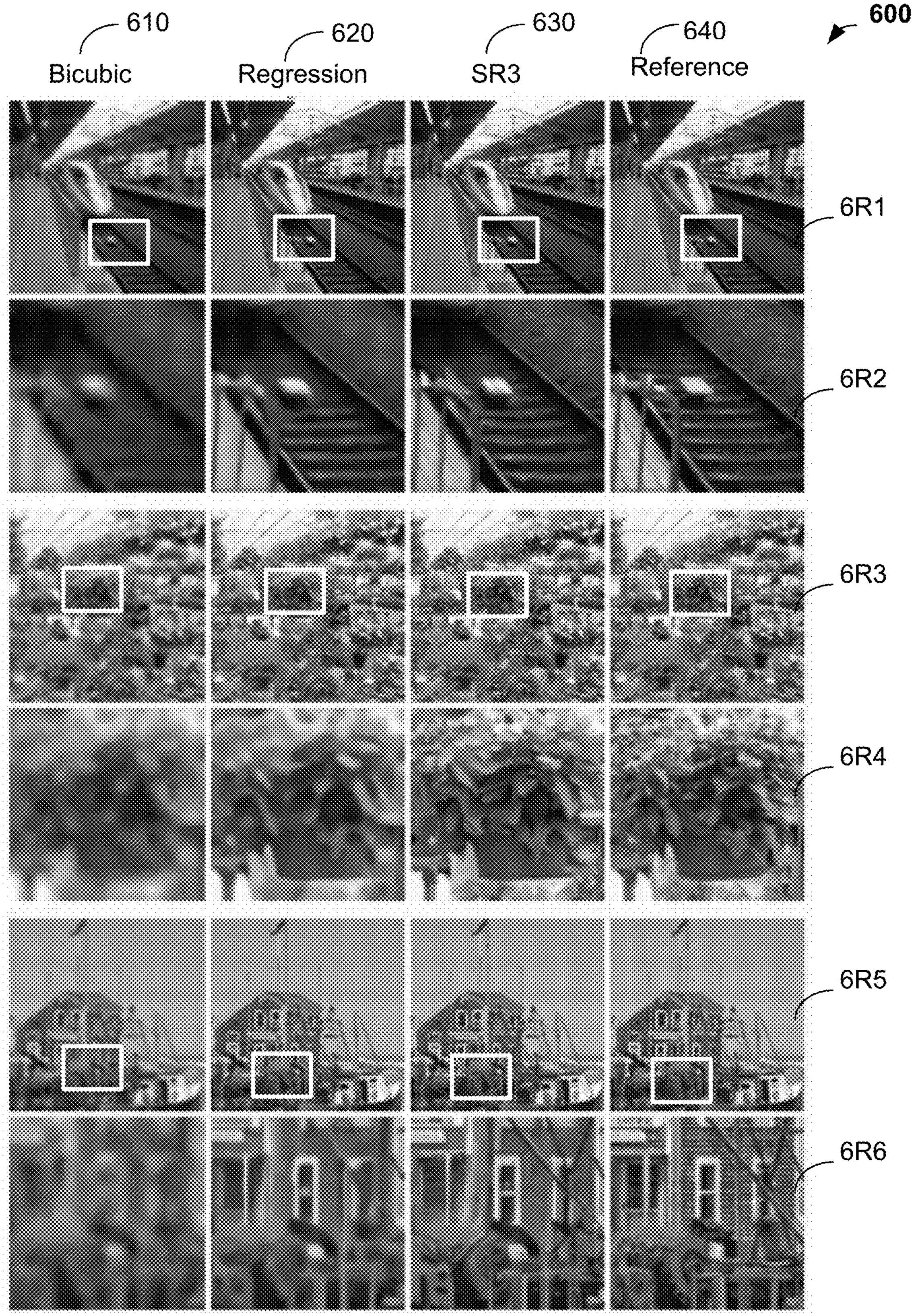
FIG. 6 illustrates example output images, in accordance with example embodiments.

FIG. 6 illustrates example output images 600, in accordance with example embodiments. For example, superresolution of natural images for 64×64→256×256 on an ImageNet dev set, are provided, along with enlarged patches for finer inspection. A bicubic model generates images displayed in the column labeled "Bicubic" 610. A baseline regression model generates images displayed in the column labeled "Regression" 620 that are faithful to the inputs, but are blurry and lack detail. Corresponding reference images are displayed in the column labeled "Reference" 640. As illustrated, images displayed in the column labeled "SR3" 630 are sharp images with more detail; this is more evident in the enlarged patches. For example, for an image of a train platform (from the ImageNet database) in row 6R1, an enlarged view of an object on the tracks (shown within a bounding box in the images in row 6R1) is displayed in row 6R2. Likewise, for each image of an arrangement of plants in row 6R3, an enlarged image of a potted plant (shown within a bounding box in the images in row 6R3) is displayed in row 6R4. As another example, for each image of a boating dock in row 6R5, an enlarged image of an object on the dock (shown within a bounding box in the images in row 6R5) is displayed in row 6R6.

Figure 7:
FIG. 7 illustrates example output images, in accordance with example embodiments.

FIG. 7 illustrates example output images 700, in accordance with example embodiments. A plurality of synthetic 256×256 resolution images based on ImageNet images are displayed. In some aspects, a random label is applied, then a 64×64 image is sampled from a class-conditional diffusion model, and a 4×SR3 model is applied to obtain the displayed 256×256 resolution images 700.

Figure 8:
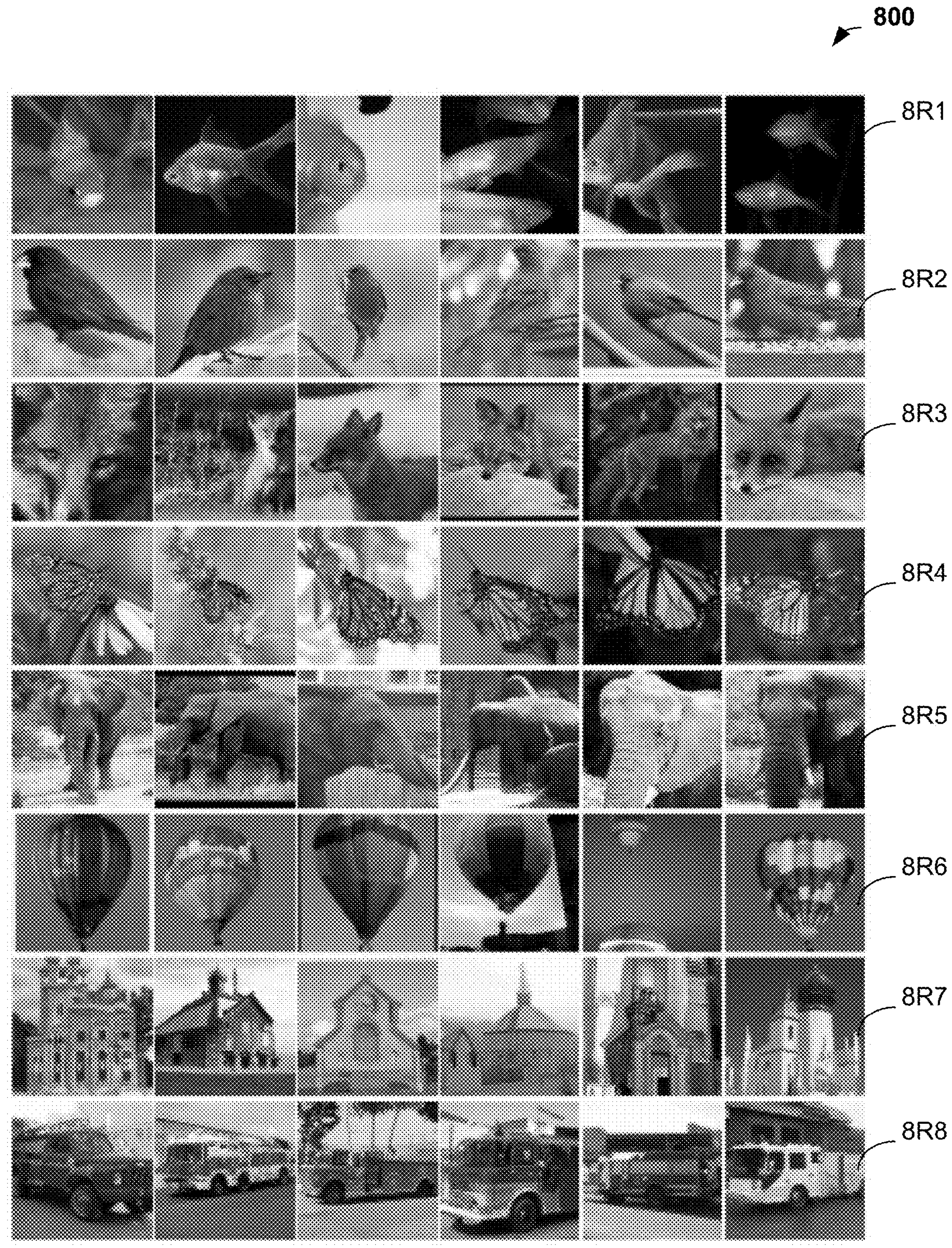
FIG. 8 illustrates example output images in different classes of objects, in accordance with example embodiments.

FIG. 8 illustrates example output images 800 in different classes of objects, in accordance with example embodiments. A plurality of class-wise Synthetic 256×256 resolution images based on ImageNet images are displayed. Each row represents a specific ImageNet class. For example, displayed classes from top to bottom are Goldfish (displayed in row 8R1), Indigo Bird (displayed in row 8R2), Red Fox (displayed in row 8R3), Monarch Butterfly (displayed in row 8R4), African Elephant (displayed in row 8R5), Balloon (displayed in row 8R6), Church (displayed in row 8R7), and Fire Truck (displayed in row 8R8). For a given class label, a 64×64 image is sampled from a class-conditional diffusion model, and a 4×SR3 model is applied to obtain the displayed 256×256 resolution images 800.

FIG. 9 is a table 900 illustrating performance comparisons between Super-Resolution via Repeated Refinement (SR3) and a Regression baseline, in accordance with example embodiments. Performance comparisons between SR3 and the Regression baseline on natural image super-resolution using standard metrics computed on an ImageNet validation set are displayed. Table 900 includes three columns and three rows. First column 910 displays a model used. Second column 920 displays Frechet Inception Distance (FID) scores associated with the model in first column 910, and third column 930 displays Inception Scores (IS) associated with the model in first column 910. Generally, a lower FID score is indicative of a higher image quality, and a higher IS is indicative of a higher image quality. For an ImageNet based super-resolution task (64×64→256× 256), the outputs of SR3 achieve higher sample quality scores (as indicated by FID and IS scores in row 9R3) than by outputs of the regression model (as indicated by FID and IS scores in row 9R2). Scores for the reference model are shown in row 9R1.

Techniques described herein enable photo-realistic super-resolution with large magnification factors. In some embodiments, direct human evaluation may be performed to identify a degree of photo-realism. While mean opinion score (MOS) may be generally used to measure image quality in this context, a forced choice pairwise comparison method may be a more reliable method for such subjective quality assessments. Furthermore, standard MOS studies do not capture consistency between low-resolution inputs and high-resolution outputs.

A 2-alternative forced-choice (2AFC) paradigm may be used to measure how well humans can discriminate true images from those generated from a model. In Task-1 subjects may be shown a low resolution input in between two high-resolution images, one being the real image (ground truth), and the other being generated from the model. Subjects may be asked "Which of the two images is a better high quality version of the low resolution image in the middle?" This task takes into account both image quality and consistency with the low resolution input.

Task-2 is similar to Task-1, except that the low-resolution image may not be shown; subjects may only be asked to select the image that appeared more photo-realistic. They may be asked, for example, "Which image would you guess is from a camera?" In one example, evaluation, subjects may view images for 3 seconds before responding, in both tasks. As used herein, the subject fool rate is the fraction of trials on which a subject selects the model output over ground truth. The fool rates described herein for each model are based on 50 subjects, each of whom may be shown 50 of the 100 images in the test set. For these results, subjects may be shown low-resolution inputs in Task-1, but the input images may not be shown in Task-2.

Figure 10:
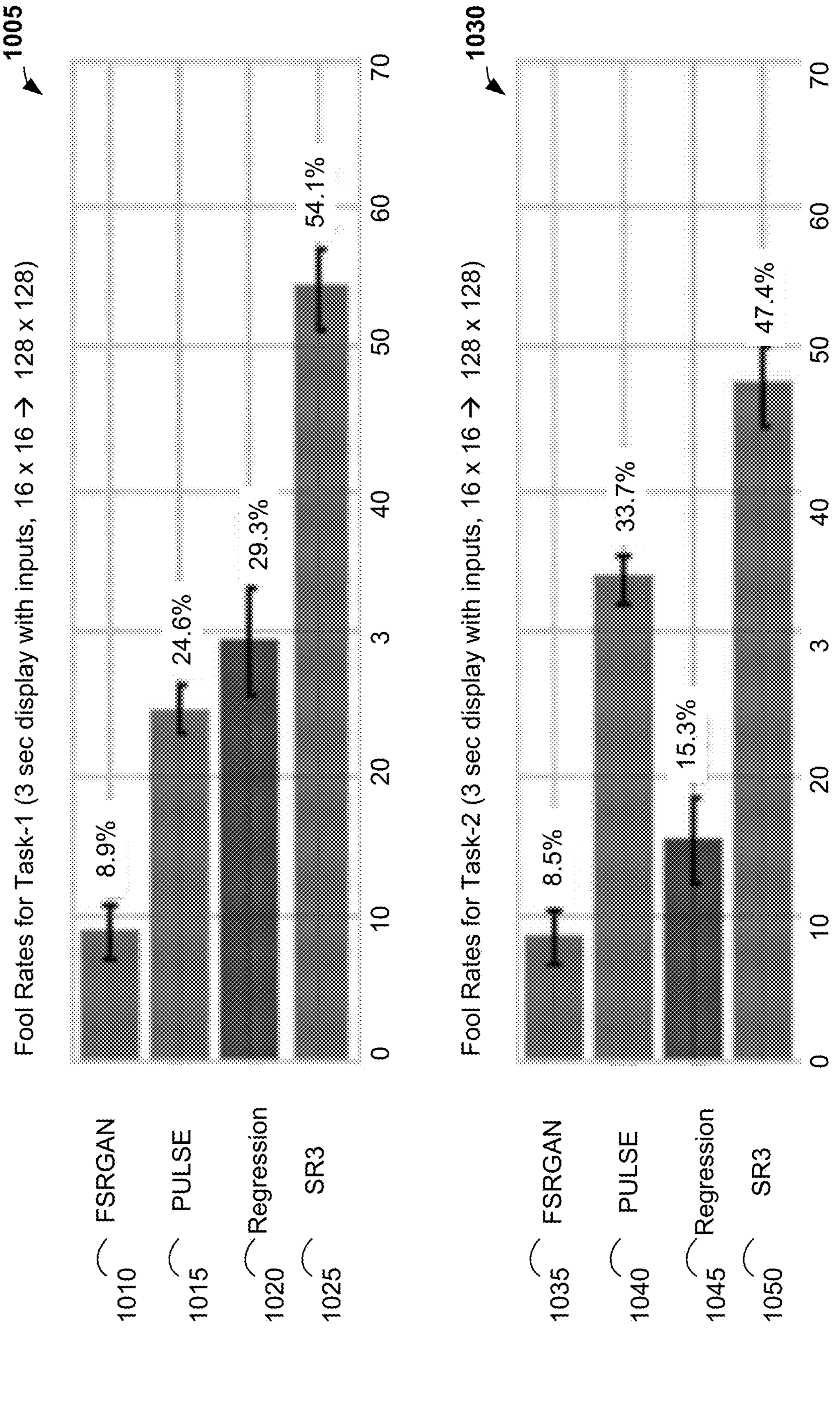
FIG. 10 illustrates histograms indicative of performance comparisons between SR3 and other models against ground truth, in accordance with example embodiments.

FIG. 10 illustrates histograms indicative of performance comparisons between SR3 and other models against ground truth, in accordance with example embodiments. FIG. 10 displays fool rates for Task-1 in bar graph 1005, and for Task-2 in bar graph 1030. Bar graph 1005 (resp. bar graph 1030) has four bars, one each for FSRGAN 1010 (resp. 1035), PULSE 1015 (resp. 1040), Regression 1020 (resp. 1045), and SR3 1025 (resp. 1050). In both experiments, the fool rate of SR3 is close to 50%, (54.1% as indicated in SR3 1025, and 47.4% as indicated in SR3 1050), indicating that SR3 produces images that are both photo-realistic and faithful to the low-resolution inputs. Similar fool rates may be obtained over a wide range of viewing durations up to 12 seconds.

The fool rates for FSRGAN 1010 and PULSE 1015 in Task-1 are lower than the Regression baseline 1020 and SR3 1025. This may happen, for example, when a PULSE optimization has failed to converge to high resolution images sufficiently close to the inputs. As is illustrated with respect to Task-2 in bar graph 1030, when asked solely about image quality in Task-2, the PULSE fool rate increases significantly, from 24.6% in PULSE 1015 to 33.7% in PULSE 1040.

The fool rate for the Regression baseline is lower in Task-2, displayed in Regression 1045 as 15.3%, than in Task-1, displayed in Regression 1020 as 29.3%. The regression model tends to generate images that are blurry, but nevertheless faithful to the low resolution input. Generally, in Task-1, given the inputs, subjects may be influenced by consistency, while in Task-2, ignoring consistency, the task may instead focus on image sharpness. Similar human evaluation studies may be conducted on natural images comparing SR3 and the regression baseline on ImageNet.

Figure 11:
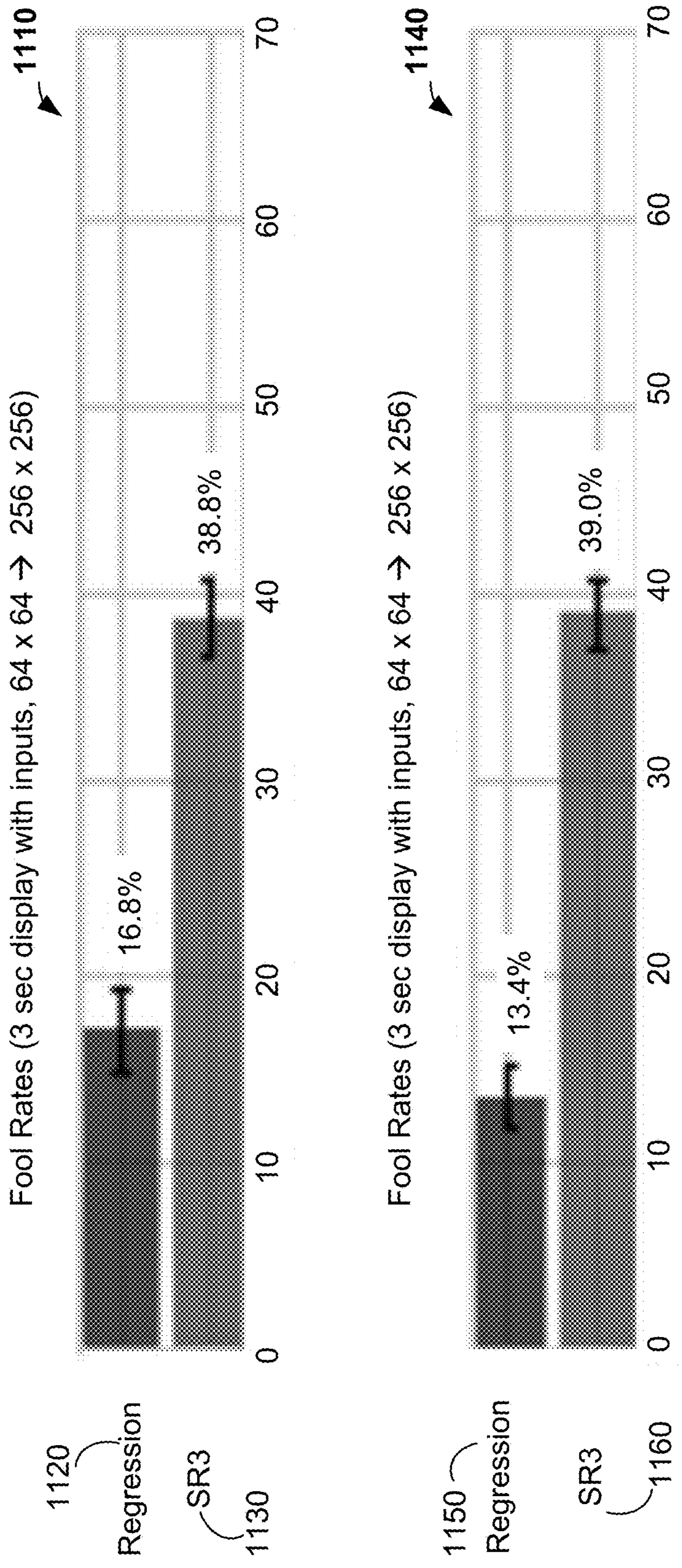
FIG. 11 illustrates histograms indicative of performance comparisons between SR3 and a Regression baseline against ground truth, in accordance with example embodiments.

FIG. 11 illustrates histograms indicative of performance comparisons between SR3 and a Regression baseline against ground truth, in accordance with example embodiments. FIG. 11 displays fool rates for Task-1 in bar graph 1110, and for Task-2 in bar graph 1140. Bar graph 1110 (resp. bar graph 1140) has two bars, one each for Regression 1120 (resp. 1150), and SR3 1130 (resp. 1160). In both tasks with natural images, SR3 achieves a human subject fool rate of close to 40% (38.8% as indicated in SR3 1130, and 39% as indicated in SR3 1160). Like the face image experiments discussed with reference to FIG. 10, the Regression baseline appears to yield a lower fool rate in Task-2, where the low resolution image is not shown. For example, the fool rate for the Regression baseline in bar graph 1140 is 13.4% as shown in Regression 1150, whereas the fool rate for the Regression baseline in bar graph 1110 is 16.8% as shown in Regression 1120. In some aspects, this may be a result of a somewhat simpler task (viewing two rather than three images), and that subjects may focus solely on image artifacts, such as blurriness, without having to focus on consistency between model output and the low resolution input.

In some embodiments, cascaded image generation may be performed, where SR3 models at different scales may be chained together with unconditional generative models, enabling high-resolution image synthesis. Cascaded generation enables training of different models in parallel, and each model in the cascade may solve a simpler task, requiring fewer parameters, resulting in fewer computations for training. Inference with cascaded models may generally be more efficient, especially for iterative refinement models. In some embodiments, with cascaded generation, it may be effective to use more refinement steps at low-resolutions, and fewer refinement steps at higher resolutions. In some embodiments, this approach may be more efficient than generating directly at high resolution without sacrificing image quality.

In some embodiments, a DDPM model may be trained for unconditional 64×64 face generation. Samples from this model may then be input to two 4×SR3 models, up-sampling to 2562 and then to 10242 pixels. Also, for example, an Improved DDPM model may be trained on class-conditional 64×64 ImageNet, and the generated samples may be input to a 4×SR3model yielding 2562 pixels. The 4×SR3 model may not be conditioned on the class label.

FIG. 12 is a table 1200 illustrating FID scores, in accordance with example embodiments. Table 1200 displays FID scores for the resulting class conditional ImageNet samples. The various models are indicated in the column for model 1210 (SR3 Model 1240 and Other Models 1230), and the corresponding FID scores are indicated in the column for FID 1220. As indicated, the FID score for the 2-stage SR3 model 1240 (displayed as 11.3) improves on the FID score for the VQ-VAE-2 model (displayed as 38.1), is comparable to deep BigGANs model at truncation factor of 1.5 (displayed as 11.8). The effectiveness of cascaded image generation indicates that SR3 models are robust to the precise distribution of inputs (i.e., the specific form of anti-aliasing and down sampling).

Ablation Studies

FIG. 13 is a table 1300 illustrating results of an ablation study on an SR3 model, in accordance with example embodiments. Table 1300 shows ablation studies on a 64×64→256×256 ImageNet SR3 model. The various models are indicated in the column for model 1310 (Model Trained with Augmentation 1230, and Model Trained with an $L_p$ norm 1340), and the corresponding FID scores are indicated in the column for FID 1320. For example, in order to improve the robustness of the SR3 model, data augmentation may be used during training. In some embodiments, the model may be trained with varying amounts of Gaussian blurring noise added to the low resolution input image. Also, for example, in some embodiments, no blurring may be applied during inference. In some aspects, this may have a significant impact, improving the FID score by approximately 2 points. For example, in training with augmentation 1330, the FID score for SR3 is 13.1, whereas for SR3 with a Gaussian Blur, the FID score is 11.3.

A choice of $L_p$ norm for the denoising objective as in Eqn. 8 may be determined. As indicated in Objective $L_p$ Norm 1340, the SR3 with the $L_1$ norm provides a better FID score at 11.3 than the SR3 with the $L_2$ norm at 11.8.

In conclusion, SR3 is an approach to image superresolution via iterative refinement. SR3 can be used in a cascaded fashion to generate high resolution super-resolution images, as well as unconditional samples when cascaded with a unconditional model. SR3 may be performed on face and natural image super-resolution at high resolution and high magnification ratios (e.g., 64×64→256×256 and 256×256→1024×1024). SR3 can achieve a human fool rate close to 50%, thereby suggesting that the outputs are photo-realistic.

Training Machine Learning Models for Generating Inferences/Predictions

Figure 14:
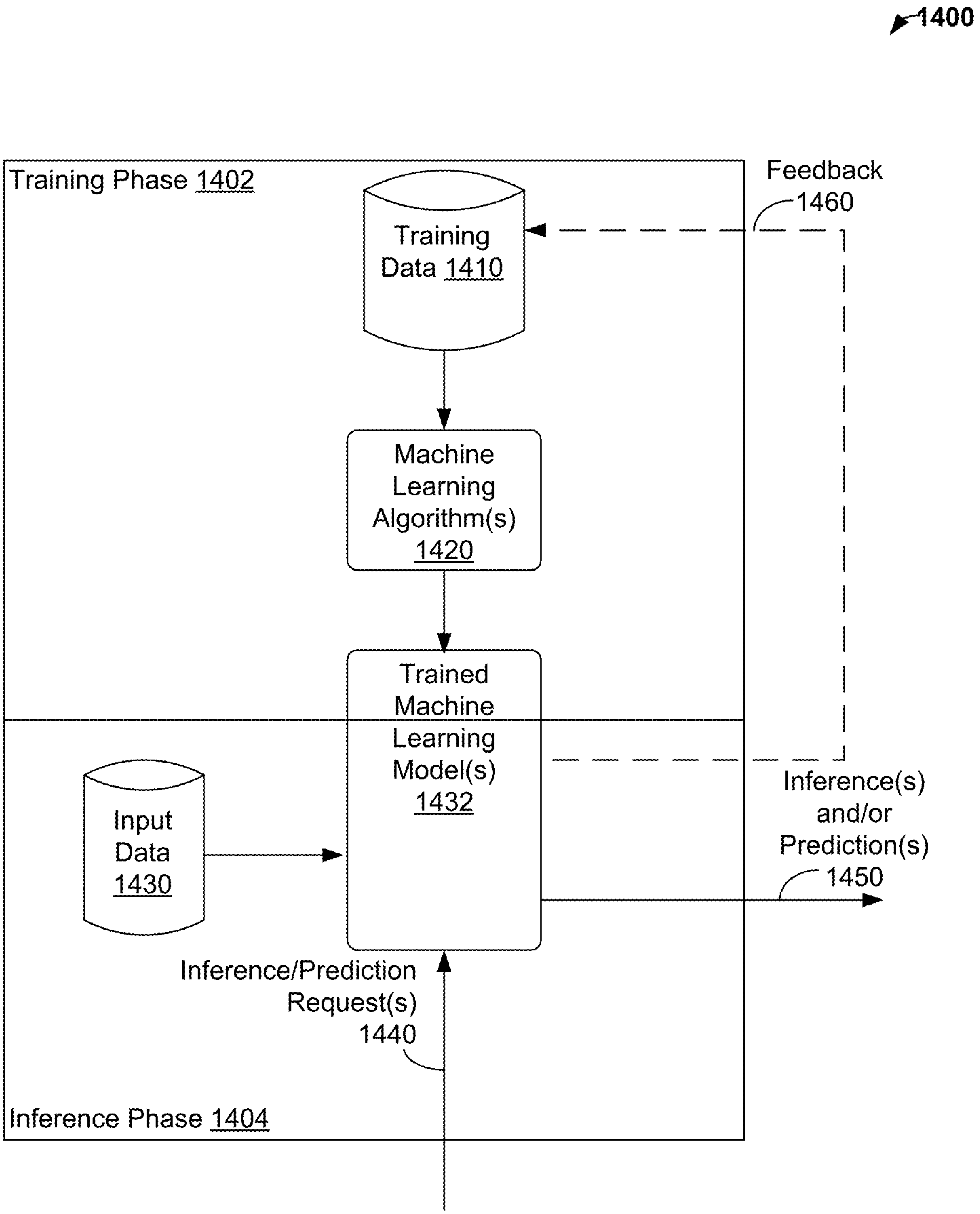
FIG. 14 is a diagram illustrating training and inference phases of a machine learning model, in accordance with example embodiments.

FIG. 14 shows diagram 1400 illustrating a training phase 1402 and an inference phase 1404 of trained machine learning model(s) 1432, in accordance with example embodiments. Some machine learning techniques involve training one or more machine learning algorithms on an input set of training data to recognize patterns in the training data and provide output inferences and/or predictions about (patterns in the) training data. The resulting trained machine learning algorithm can be termed as a trained machine learning model. For example, FIG. 14 shows training phase 1402 where one or more machine learning algorithms 1420 are being trained on training data 1410 to become trained machine learning model(s) 1432. Then, during inference phase 1404, trained machine learning model(s) 1432 can receive input data 1430 and one or more inference/prediction requests 1440 (perhaps as part of input data 1430) and responsively provide as an output one or more inferences and/or prediction(s) 1450.

As such, trained machine learning model(s) 1432 can include one or more models of one or more machine learning algorithms 1420. Machine learning algorithm(s) 1420 may include, but are not limited to: an artificial neural network (e.g., herein-described convolutional neural networks, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 1420 may be supervised or unsupervised, and may implement any suitable combination of online and offline learning.

In some examples, machine learning algorithm(s) 1420 and/or trained machine learning model(s) 1432 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 1420 and/or trained machine learning model(s) 1432. In some examples, trained machine learning model(s) 1432 can be trained, can reside, and can execute to provide inferences on a particular computing device, and/or otherwise can make inferences for the particular computing device.

During training phase 1402, machine learning algorithm (s) 1420 can be trained by providing at least training data 1410 as training input using unsupervised, supervised, semi-supervised, and/or reinforcement learning techniques. Unsupervised learning involves providing a portion (or all) of training data 1410 to machine learning algorithm(s) 1420 and machine learning algorithm(s) 1420 determining one or more output inferences based on the provided portion (or all) of training data 1410. Supervised learning involves providing a portion of training data 1410 to machine learning algorithm(s) 1420, with machine learning algorithm(s) 1420 determining one or more output inferences based on the provided portion of training data 1410, and the output inference(s) are either accepted or corrected based on correct results associated with training data 1410. In some examples, supervised learning of machine learning algorithm(s) 1420 can be governed by a set of rules and/or a set of labels for the training input, and the set of rules and/or set of labels may be used to correct inferences of machine learning algorithm(s) 1420.

Semi-supervised learning involves having correct results for part, but not all, of training data 1410. During semi-supervised learning, supervised learning is used for a portion of training data 1410 having correct results, and unsupervised learning is used for a portion of training data 1410 not having correct results. Reinforcement learning involves machine learning algorithm(s) 1420 receiving a reward signal regarding a prior inference, where the reward signal can be a numerical value. During reinforcement learning, machine learning algorithm(s) 1420 can output an inference and receive a reward signal in response, where machine learning algorithm(s) 1420 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 1420 and/or trained machine learning model(s) 1432 can be trained using other machine learning techniques, including but not limited to, incremental learning and curriculum learning.

In some examples, machine learning algorithm(s) 1420 and/or trained machine learning model(s) 1432 can use transfer learning techniques. For example, transfer learning techniques can involve trained machine learning model(s) 1432 being pre-trained on one set of data and additionally trained using training data 1410. More particularly, machine learning algorithm(s) 1420 can be pre-trained on data from one or more computing devices and a resulting trained machine learning model provided to a particular computing device, where the particular computing device is intended to execute the trained machine learning model during inference phase 1404. Then, during training phase 1402, the pre-trained machine learning model can be additionally trained using training data 1410, where training data 1410 can be derived from kernel and non-kernel data of the particular computing device. This further training of the machine learning algorithm(s) 1420 and/or the pre-trained machine learning model using training data 1410 of the particular computing device's data can be performed using either supervised or unsupervised learning. Once machine learning algorithm(s) 1420 and/or the pre-trained machine learning model has been trained on at least training data 1410, training phase 1402 can be completed. The trained resulting machine learning model can be utilized as at least one of trained machine learning model(s) 1432.

In particular, once training phase 1402 has been completed, trained machine learning model(s) 1432 can be provided to a computing device, if not already on the computing device. Inference phase 1404 can begin after trained machine learning model(s) 1432 are provided to the particular computing device.

During inference phase 404, trained machine learning model(s) 1432 can receive input data 1430 and generate and output one or more corresponding inferences and/or predictions 1450 about input data 1430. As such, input data 1430 can be used as an input to trained machine learning model(s) 1432 for providing corresponding inference(s) and/or prediction(s) 1450 to kernel components and non-kernel components. For example, trained machine learning model(s) 1432 can generate inference(s) and/or prediction(s) 1450 in response to one or more inference/prediction requests 1440. In some examples, trained machine learning model(s) 1432 can be executed by a portion of other software. For example, trained machine learning model(s) 1432 can be executed by an inference or prediction daemon to be readily available to provide inferences and/or predictions upon request. Input data 1430 can include data from the particular computing device executing trained machine learning model(s) 1432 and/or input data from one or more computing devices other than the particular computing device.

Inference(s) and/or prediction(s) 1450 can include output images, output intermediate images, numerical values, and/or other output data produced by trained machine learning model(s) 1432 operating on input data 1430 (and training data 1410). In some examples, trained machine learning model(s) 1432 can use output inference(s) and/or prediction (s) 1450 as input feedback 1460. Trained machine learning model(s) 1432 can also rely on past inferences as inputs for generating new inferences.

A neural network comprising a U-net architecture 300A can be an example of machine learning algorithm(s) 1420. After training, the trained version of the neural network can be an example of trained machine learning model(s) 1432. In this approach, an example of the one or more inference/prediction request(s) 1440 can be a request to enhance an input image and a corresponding example of inferences and/or prediction(s) 1450 can be a predicted enhanced version of the input image.

In some examples, one computing device can include the trained version of the neural network, perhaps after training. Then, another computing device can receive a request to enhance input data (e.g., increase resolution), and use the trained version of the neural network to generate an enhanced version of the input data.

In some examples, two or more computing devices can be used to provide output images; e.g., a first computing device can generate and send requests to enhance input data to a second computing device. Then, the second computing device can use the trained version of the neural network, to enhance the input data, and respond to the requests from the first computing device for the enhanced output image. Then, upon reception of responses to the requests, the first computing device can provide the requested output image (e.g., using a user interface and/or a display, a printed copy, an electronic communication, etc.).

Example Data Network

Figure 15:
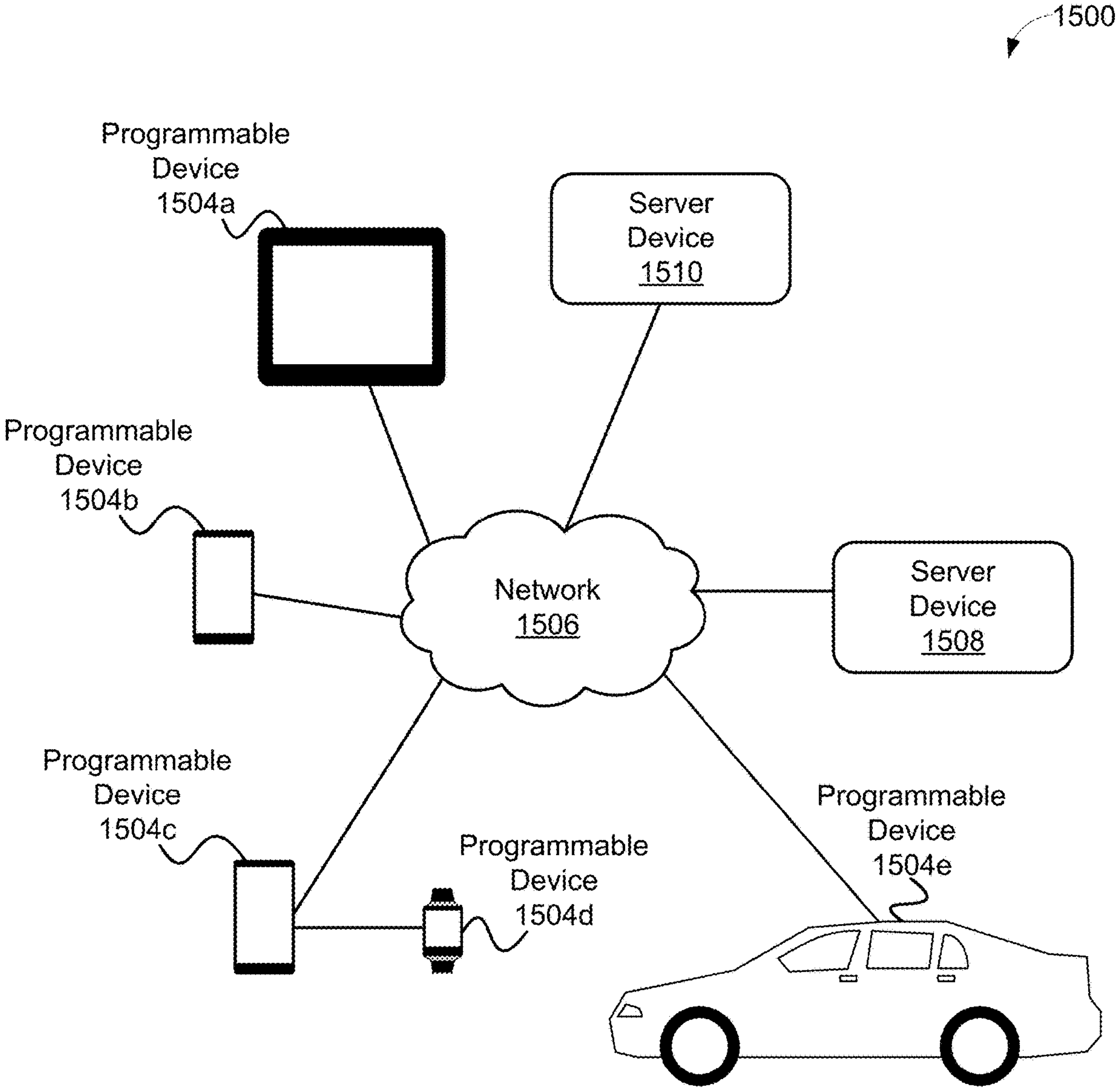
FIG. 15 depicts a distributed computing architecture, in accordance with example embodiments.

FIG. 15 depicts a distributed computing architecture 1500, in accordance with example embodiments. Distributed computing architecture 1500 includes server devices 1508, 1510 that are configured to communicate, via network 1506, with programmable devices 1504*a*, 1504*b*, 1504*c*, 1504*d*, 1504*c*. Network 1506 may correspond to a local area network (LAN), a wide area network (WAN), a WLAN, a WWAN, a corporate intranet, the public Internet, or any other type of network configured to provide a communications path between networked computing devices. Network 1506 may also correspond to a combination of one or more LANs, WANs, corporate intranets, and/or the public Internet.

Although FIG. 15 only shows five programmable devices, distributed application architectures may serve tens, hundreds, or thousands of programmable devices. Moreover, programmable devices 1504*a*, 1504*b*, 1504*c*, 1504*d*, 1504*c* (or any additional programmable devices) may be any sort of computing device, such as a mobile computing device, desktop computer, wearable computing device, head-mountable device (HMD), network terminal, a mobile computing device, and so on. In some examples, such as illustrated by programmable devices 1504*a*, 1504*b*, 1504*c*, 1504*c*, programmable devices can be directly connected to network 1506. In other examples, such as illustrated by programmable device 1504*d*, programmable devices can be indirectly connected to network 1506 via an associated computing device, such as programmable device 1504*c*. In this example, programmable device 1504*c* can act as an associated computing device to pass electronic communications between programmable device 1504*d* and network 1506. In other examples, such as illustrated by programmable device 1504*c*, a computing device can be part of and/or inside a vehicle, such as a car, a truck, a bus, a boat or ship, an airplane, etc. In other examples not shown in FIG. 15, a programmable device can be both directly and indirectly connected to network 1506.

Server devices 1508, 1510 can be configured to perform one or more services, as requested by programmable devices 1504*a*-1504*c*. For example, server device 1508 and/or 1510 can provide content to programmable devices 1504*a*-1504*c*. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 1508 and/or 1510 can provide programmable devices 1504*a*-1504*e* with access to software for database, search, computation, graphical, audio, video, World Wide Web/Internet utilization, and/or other functions. Many other examples of server devices are possible as well.

Computing Device Architecture

Figure 16:
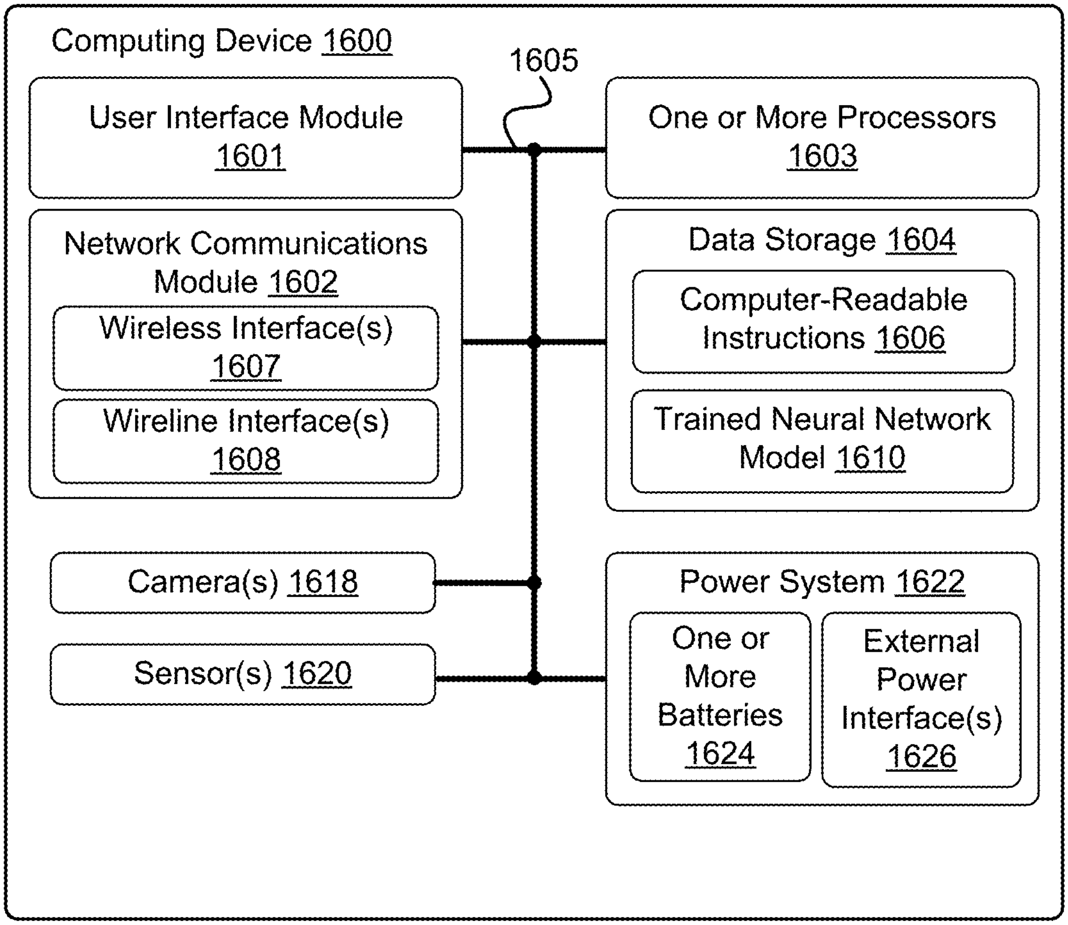
FIG. 16 is a block diagram of a computing device, in accordance with example embodiments.

FIG. 16 is a block diagram of an example computing device 1600, in accordance with example embodiments. In particular, computing device 1600 shown in FIG. 16 can be configured to perform at least one function of and/or related to a neural network 300A, method 1800, and/or method 1900.

Computing device 1600 may include a user interface module 1601, a network communications module 1602, one or more processors 1603, data storage 1604, one or more camera(s) 1618, one or more sensors 1620, and power system 1622, all of which may be linked together via a system bus, network, or other connection mechanism 1605.

User interface module 1601 can be operable to send data to and/or receive data from external user input/output devices. For example, user interface module 1601 can be configured to send and/or receive data to and/or from user input devices such as a touch screen, a computer mouse, a keyboard, a keypad, a touch pad, a trackball, a joystick, a voice recognition module, and/or other similar devices. User interface module 1601 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 1601 can also be configured to generate audible outputs, with devices such as a speaker, speaker jack, audio output port, audio output device, e, and/or other similar devices. User interface module 1601 can further be configured with one or more haptic devices that can generate haptic outputs, such as vibrations and/or other outputs detectable by touch and/or physical contact with computing device 1600. In some examples, user interface module 1601 can be used to provide a graphical user interface (GUI) for utilizing computing device 1600, such as, for example, a graphical user interface of a mobile phone device.

Network communications module 1602 can include one or more devices that provide one or more wireless interface (s) 1607 and/or one or more wireline interface(s) 1608 that are configurable to communicate via a network. Wireless interface(s) 1607 can include one or more wireless transmitters, receivers, and/or transceivers, such as a Bluetooth™ transceiver, a Zigbee® transceiver, a Wi-Fi™ transceiver, a WiMAX™ transceiver, an LTE™ transceiver, and/or other type of wireless transceiver configurable to communicate via a wireless network. Wireline interface(s) 1608 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 1602 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 1603 can include one or more general purpose processors, and/or one or more special purpose processors (e.g., digital signal processors, tensor processing units (TPUs), graphics processing units (GPUs), application specific integrated circuits, etc.). One or more processors 1603 can be configured to execute computer-readable instructions 1606 that are contained in data storage 1604 and/or other instructions as described herein.

Data storage 1604 can include one or more non-transitory computer-readable storage media that can be read and/or accessed by at least one of one or more processors 1603. The one or more computer-readable storage media can include volatile and/or non-volatile storage components, such as optical, magnetic, organic or other memory or disc storage, which can be integrated in whole or in part with at least one of one or more processors 1603. In some examples, data storage 1604 can be implemented using a single physical device (e.g., one optical, magnetic, organic or other memory or disc storage unit), while in other examples, data storage 1604 can be implemented using two or more physical devices.

Data storage 1604 can include computer-readable instructions 1606 and perhaps additional data. In some examples, data storage 1604 can include storage required to perform at least part of the herein-described methods, scenarios, and techniques and/or at least part of the functionality of the herein-described devices and networks. In some examples, data storage 1604 can include storage for a trained neural network model 1610 (e.g., a model of trained neural networks such as a U-net architecture based neural network). In particular of these examples, computer-readable instructions 1606 can include instructions that, when executed by one or more processors 1603, enable computing device 1600 to provide for some or all of the functionality of trained neural network model 1610.

In some examples, computing device 1600 can include one or more camera(s) 1618. Camera(s) 1618 can include one or more image capture devices, such as still and/or video cameras, equipped to capture light and record the captured light in one or more images; that is, camera(s) 1618 can generate image(s) of captured light. The one or more images can be one or more still images and/or one or more images utilized in video imagery. Camera(s) 1618 can capture light and/or electromagnetic radiation emitted as visible light, infrared radiation, ultraviolet light, and/or as one or more other frequencies of light.

In some examples, computing device 1600 can include one or more sensors 1620. Sensors 1620 can be configured to measure conditions within computing device 1600 and/or conditions in an environment of computing device 1600 and provide data about these conditions. For example, sensors 1620 can include one or more of: (i) sensors for obtaining data about computing device 1600, such as, but not limited to, a thermometer for measuring a temperature of computing device 1600, a battery sensor for measuring power of one or more batteries of power system 1622, and/or other sensors measuring conditions of computing device 1600; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 1600, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 1600, such as, but not limited to, an infrared sensor, an optical sensor, a light sensor, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 1600, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 1620 are possible as well.

Power system 1622 can include one or more batteries 1624 and/or one or more external power interfaces 1626 for providing electrical power to computing device 1600. Each battery of the one or more batteries 1624 can, when electrically coupled to the computing device 1600, act as a source of stored electrical power for computing device 1600. One or more batteries 1624 of power system 1622 can be configured to be portable. Some or all of one or more batteries 1624 can be readily removable from computing device 1600. In other examples, some or all of one or more batteries 1624 can be internal to computing device 1600, and so may not be readily removable from computing device 1600. Some or all of one or more batteries 1624 can be rechargeable. For example, a rechargeable battery can be recharged via a wired connection between the battery and another power supply, such as by one or more power supplies that are external to computing device 1600 and connected to computing device 1600 via the one or more external power interfaces. In other examples, some or all of one or more batteries 1624 can be non-rechargeable batteries.

One or more external power interfaces 1626 of power system 1622 can include one or more wired-power interfaces, such as a USB cable and/or a power cord, that enable wired electrical power connections to one or more power supplies that are external to computing device 1600. One or more external power interfaces 1626 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 1626, computing device 1600 can draw electrical power from the external power source the established electrical power connection. In some examples, power system 1622 can include related sensors, such as battery sensors associated with the one or more batteries or other types of electrical power sensors.

Cloud-Based Servers

Figure 17:
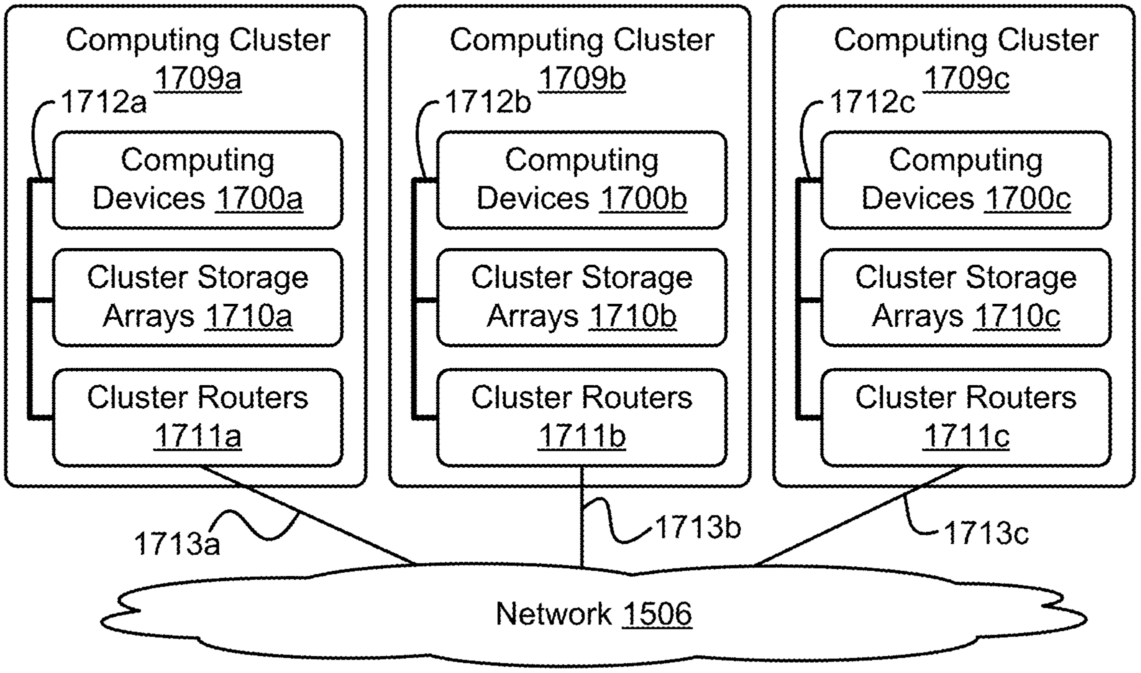
FIG. 17 depicts a network of computing clusters arranged as a cloud-based server system, in accordance with example embodiments.

FIG. 17 depicts a cloud-based server system in accordance with an example embodiment. In FIG. 17, functionality of a neural network, and/or a computing device can be distributed among computing clusters 1709*a*, 1709*b*, 1709*c*. Computing cluster 1709*a* can include one or more computing devices 1700*a*, cluster storage arrays 1710*a*, and cluster routers 1711*a* connected by a local cluster network 1712*a*. Similarly, computing cluster 1709*b* can include one or more computing devices 1700*b*, cluster storage arrays 1710*b*, and cluster routers 1711*b* connected by a local cluster network 1712*b*. Likewise, computing cluster 1709*c* can include one or more computing devices 1700*c*, cluster storage arrays 1710*c*, and cluster routers 1711*c* connected by a local cluster network 1712*c*.

In some embodiments, computing clusters 1709*a*, 1709*b*, 1709*c* can be a single computing device residing in a single computing center. In other embodiments, computing clusters 1709*a*, 1709*b*, 1709*c* can include multiple computing devices in a single computing center, or even multiple computing devices located in multiple computing centers located in diverse geographic locations. For example, FIG. 17 depicts each of computing clusters 1709*a*, 1709*b*, 1709*c* residing in different physical locations.

In some embodiments, data and services at computing clusters 1709*a*, 1709*b*, 1709*c* can be encoded as computer readable information stored in non-transitory, tangible computer readable media (or computer readable storage media) and accessible by other computing devices. In some embodiments, computing clusters 1709*a*, 1709*b*, 1709*c* can be stored on a single disk drive or other tangible storage media, or can be implemented on multiple disk drives or other tangible storage media located at one or more diverse geographic locations.

In some embodiments, each of computing clusters 1709*a*, 1709*b*, and 1709*c* can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 1709*a*, for example, computing devices 1700*a* can be configured to perform various computing tasks of a conditioned, axial self-attention based neural network, and/or a computing device. In one embodiment, the various functionalities of a neural network, and/or a computing device can be distributed among one or more of computing devices 1700*a*, 1700*b*, 1700*c*. Computing devices 1700*b* and 1700*c* in respective computing clusters 1709*b* and 1709*c* can be configured similarly to computing devices 1700*a* in computing cluster 1709*a*. On the other hand, in some embodiments, computing devices 1700*a*, 1700*b*, and 1700*c* can be configured to perform different functions.

In some embodiments, computing tasks and stored data associated with a neural network, and/or a computing device can be distributed across computing devices 1700*a*, 1700*b*, and 1700*c* based at least in part on the processing requirements of a neural network, and/or a computing device, the processing capabilities of computing devices 1700*a*, 1700*b*, 1700*c*, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 1710*a*, 1710*b*, 1710*c* of computing clusters 1709*a*, 1709*b*, 1709*c* can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a conditioned, axial self-attention based neural network, and/or a computing device can be distributed across computing devices 1700*a*, 1700*b*, 1700*c* of computing clusters 1709*a*, 1709*b*, 1709*c*, various active portions and/or backup portions of these components can be distributed across cluster storage arrays 1710*a*, 1710*b*, 1710*c*. For example, some cluster storage arrays can be configured to store one portion of the data of a first layer of a neural network, and/or a computing device, while other cluster storage arrays can store other portion(s) of data of second layer of a neural network, and/or a computing device. Also, for example, some cluster storage arrays can be configured to store the data of an encoder of a neural network, while other cluster storage arrays can store the data of a decoder of a neural network. Additionally, some cluster storage arrays can be configured to store backup versions of data stored in other cluster storage arrays.

Cluster routers 1711*a*, 1711*b*, 1711*c* in computing clusters 1709*a*, 1709*b*, 1709*c* can include networking equipment configured to provide internal and external communications for the computing clusters. For example, cluster routers 1711*a* in computing cluster 1709*a* can include one or more internet switching and routing devices configured to provide (i) local area network communications between computing devices 1700*a* and cluster storage arrays 1710*a* via local cluster network 1712*a*, and (ii) wide area network communications between computing cluster 1709*a* and computing clusters 1709*b* and 1709*c* via wide area network link 1713*a* to network 1506. Cluster routers 1711*b* and 1711*c* can include network equipment similar to cluster routers 1711*a*, and cluster routers 1711*b* and 1711*c* can perform similar networking functions for computing clusters 1709*b* and 1709*b* that cluster routers 1711*a* perform for computing cluster 1709*a*.

In some embodiments, the configuration of cluster routers 1711*a*, 1711*b*, 1711*c* can be based at least in part on the data communication requirements of the computing devices and cluster storage arrays, the data communications capabilities of the network equipment in cluster routers 1711*a*, 1711*b*, 1711*c*, the latency and throughput of local cluster networks 1712*a*, 1712*b*, 1712*c*, the latency, throughput, and cost of wide area network links 1713*a*, 1713*b*, 1713*c*, and/or other factors that can contribute to the cost, speed, fault-tolerance, resiliency, efficiency and/or other design criteria of the moderation system architecture.

Example Methods of Operation

Figure 18:
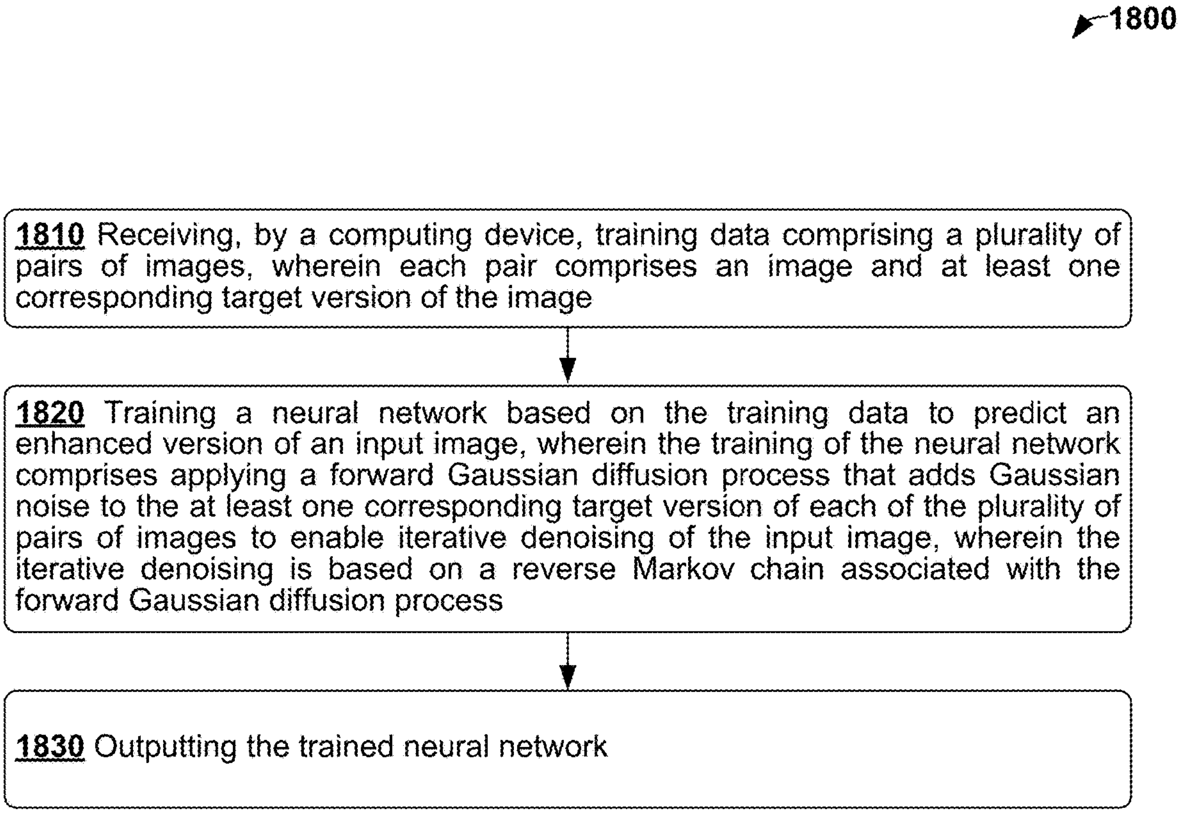
FIG. 18 is a flowchart of a method, in accordance with example embodiments.

FIG. 18 is a flowchart of a method 1800, in accordance with example embodiments. Method 1800 can be executed by a computing device, such as computing device 1600. Method 1800 can begin at block 1810, where the method involves receiving, by a computing device, training data comprising a plurality of pairs of images, wherein each pair comprises an image and at least one corresponding target version of the image.

At block 1820, the method involves training a neural network based on the training data to predict an enhanced version of an input image, wherein the training of the neural network comprises applying a forward Gaussian diffusion process that adds Gaussian noise to the at least one corresponding target version of each of the plurality of pairs of images to enable iterative denoising of the input image, wherein the iterative denoising is based on a reverse Markov chain associated with the forward Gaussian diffusion process.

At block 1830, the method involves outputting the trained neural network.

In some embodiments, the applying of the forward Gaussian diffusion process involves determining, for an iterative step, a scalar hyperparameter indicative of a variance of the Gaussian noise at the iterative step.

In some embodiments, the iterative denoising of the input image involves predicting a noise vector based on a variance of the Gaussian noise added during the forward Gaussian process.

In some embodiments, the neural network may be a convolutional neural network comprising a U-net architecture based on a denoising diffusion probabilistic (DDPM) model.

In some embodiments, the input image may be of a first resolution and the enhanced version of the input image may be of a second resolution, and wherein the second resolution is greater than the first resolution.

In some embodiments, the iterative denoising of the input image involves upsampling the input image to an enhanced version by applying bicubic interpolation.

In some embodiments, the neural network may include a plurality of cascading models. In some embodiments, the plurality of cascading models may be chained together.

In some embodiments, the iterative denoising of the input image involves a plurality of iterative refinement steps corresponding to different levels of image quality, and wherein each step is trained with a regression loss. In some embodiments, a number of the plurality of iterative refinement steps may be greater for refinement steps corresponding to a lower image quality than for refinement steps corresponding to a higher image quality.

In some embodiments, the neural network may include a plurality of cascading models, and wherein the training of the neural network involves training the plurality of cascading models in parallel.

In some embodiments, the training of the neural network may be performed at the computing device.

Figure 19:
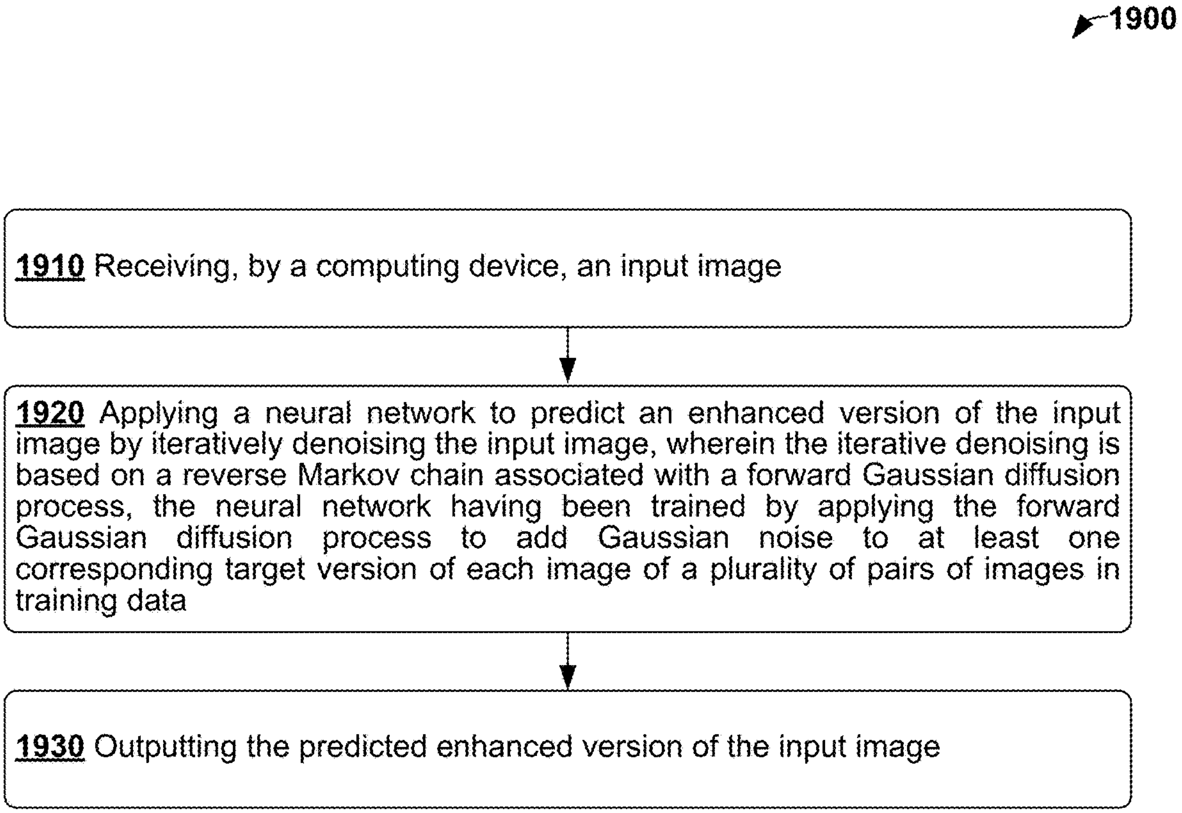
FIG. 19 is another flowchart of a method, in accordance with example embodiments.

FIG. 19 is another flowchart of a method 1900, in accordance with example embodiments. Method 1900 can be executed by a computing device, such as computing device 1600. Method 1900 can begin at block 1910, where the method involves receiving, by a computing device, an input image.

At block 1920, the method involves applying a neural network to predict an enhanced version of the input image by iteratively denoising the input image, wherein the iterative denoising is based on a reverse Markov chain associated with a forward Gaussian diffusion process, the neural network having been trained by applying the forward Gaussian diffusion process to add Gaussian noise to at least one corresponding target version of each image of a plurality of pairs of images in training data.

At block 1930, the method involves outputting the predicted enhanced version of the input image.

In some embodiments, the neural network may be a convolutional neural network comprising a U-net architecture based on a denoising diffusion probabilistic (DDPM) model.

In some embodiments, the iterative denoising of the input image involves upsampling the input image to an enhanced version by applying bicubic interpolation.

In some embodiments, the neural network may include a plurality of cascading models. In some embodiments, the plurality of cascading models may be chained together.

In some embodiments, the outputting of the predicted enhanced version of the input image involves obtaining a trained neural network at the computing device. In such embodiments, the method further involves applying the trained neural network as obtained to the outputting of the predicted enhanced version of the input image.

In some embodiments, the outputting of the predicted enhanced version of the input image involves determining, by the computing device, a request to predict the enhanced version of the input image. The method also involves sending the request from the computing device to a second computing device, the second computing device comprising a trained version of the neural network. The method additionally involves, after sending the request, the computing device receiving, from the second computing device, the predicted enhanced version of the input image.

In some embodiments, the input image may be of a first image resolution and the enhanced version of the input image may be of a second image resolution, and wherein the second image resolution is greater than the first image resolution.

In some embodiments, the input image may be of a first color version and the enhanced version of the input image may be of a second color version, and wherein the second color version is of a higher quality than the first color version. For example, the input image may be a grayscale image, or a black and white image, and the enhanced version of the input image may be a colored version of the input image.

In some embodiments, the input image may be of a first light composition and the enhanced version of the input image may be of a second light composition, and wherein the second light composition is of a higher quality than the first light composition.

In some embodiments, the input image may include video content.

In some embodiments, the input image may be a compressed image file, and wherein the predicted enhanced version may be a decompressed version of the compressed image file.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are provided for explanatory purposes and are not intended to be limiting, with the true scope being indicated by the following claims.

What is claimed is:

1. A computer-implemented method, comprising:

receiving training data from an image database;

training, based on the training data, a neural network to predict a high-resolution version of a low-resolution input image, wherein the training comprises denoising score matching to train one or more non-normalized energy functions for density estimation, and wherein the neural network is trained based on a diffusion process comprising:

an image corruption process that iteratively adds noise to a high-resolution image, and an image denoising process that learns to reverse the image corruption process by starting from an initial noisy image and iteratively removing noise from the initial image to achieve a target distribution; and providing the trained neural network.

2. The computer-implemented method of claim 1, wherein the denoising score matching comprises learning a parametric score function to approximate a gradient of an empirical data log-density.

3. The computer-implemented method of claim 2, wherein the denoising score matching comprises replacing a data point with a Gaussian distribution having a variance below a variance threshold.

4. The computer-implemented method of claim 1, further comprising:

receiving training data comprising a plurality of pairs of images, wherein each pair comprises an image and at least one corresponding target version of the image, and wherein the image corruption process comprises applying a forward Gaussian diffusion process that adds Gaussian noise to the at least one corresponding target version of each of the plurality of pairs of images, and wherein the image denoising process is based on a reverse Markov chain associated with the forward Gaussian diffusion process.

5. The computer-implemented method of claim 4, wherein the forward Gaussian diffusion process comprises determining, for an iterative step, a scalar hyperparameter indicative of a variance of the Gaussian noise at the iterative step.

6. The computer-implemented method of claim 1, wherein the image database is an IMAGENET database.

7. The computer-implemented method of claim 1, further comprising:

downsampling the low-resolution input image using bicubic interpolation.

8. The computer-implemented method of claim 1, wherein a training objective for the training is based on a variational lower bound.

9. The computer-implemented method of claim 1, wherein the image denoising process comprises predicting a noise vector based on a variance of a Gaussian noise added during a forward Gaussian process.

10. The computer-implemented method of claim 1, wherein the neural network is a convolutional neural network comprising a U-net architecture based on a denoising diffusion probabilistic (DDPM) model.

11. The computer-implemented method of claim 1, wherein the image denoising process further comprises:

a plurality of iterative refinement steps corresponding to different levels of image quality, and wherein each step is trained with a regression loss.

12. The computer-implemented method of claim 1, wherein the neural network comprises a plurality of cascading models.

13. The computer-implemented method of claim 12, wherein the plurality of cascading models are chained together.

14. The computer-implemented method of claim 12, wherein the training of the neural network comprises training the plurality of cascading models in parallel.

15. A computer-implemented method, comprising:

receiving, by a computing device, a low-resolution input image;

applying a neural network to predict a high-resolution version of the low-resolution input image, the neural network having been trained based on a diffusion process comprising:

an image corruption process that iteratively adds noise to a high-resolution image, an image denoising process that learns to reverse the image corruption process by starting from an initial noisy image and iteratively removing noise from the initial image to achieve a target distribution, and wherein the training was based on denoising score matching to train one or more non-normalized energy functions for density estimation;

providing the high-resolution version of the low-resolution input image.

16. The computer-implemented method of claim 15, wherein the training further comprises:

direct conditioning on the low-resolution input image.

17. The computer-implemented method of claim 15, further comprising:

upsampling the low-resolution input image using an interpolation based on nearby pixels.

18. The computer-implemented method of claim 15, wherein the image denoising process is performed by a hierarchy of denoising encoders.

19. The computer-implemented method of claim 15, wherein the neural network is a convolutional neural network comprising a U-net architecture based on a denoising diffusion probabilistic (DDPM) model.

20. A computing device, comprising:

one or more processors; and data storage, wherein the data storage has stored thereon computer-executable instructions that, when executed by the one or more processors, cause the computing device to carry out operations comprising:

receiving, by a computing device, a low-resolution input image;

applying a neural network to predict a high-resolution version of the low-resolution input image, the neural network having been trained based on a diffusion process comprising:

an image corruption process that iteratively adds noise to a high-resolution image, an image denoising process that learns to reverse the image corruption process by starting from an initial noisy image and iteratively removing noise from the initial image to achieve a target distribution, and wherein the training was based on denoising score matching to train one or more non-normalized energy functions for density estimation;

providing the high-resolution version of the low-resolution input image.

* * * * *